United States Patent
Nishibe et al.

(10) Patent No.: US 10,868,977 B2
(45) Date of Patent: Dec. 15, 2020

(54) INFORMATION PROCESSING APPARATUS, INFORMATION PROCESSING METHOD, AND PROGRAM CAPABLE OF ADAPTIVELY DISPLAYING A VIDEO CORRESPONDING TO SENSED THREE-DIMENSIONAL INFORMATION

(71) Applicant: SONY CORPORATION, Tokyo (JP)

(72) Inventors: Mitsuru Nishibe, Chiba (JP); Hiroyuki Aga, Tokyo (JP); Koichi Kawasaki, Tokyo (JP); Atsushi Ishihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/473,130

(22) PCT Filed: Oct. 17, 2017

(86) PCT No.: PCT/JP2017/037442
§ 371 (c)(1),
(2) Date: Jun. 24, 2019

(87) PCT Pub. No.: WO2018/131238
PCT Pub. Date: Jul. 19, 2018

(65) Prior Publication Data
US 2019/0364224 A1 Nov. 28, 2019

(30) Foreign Application Priority Data

Jan. 16, 2017 (JP) .................................. 2017-005077

(51) Int. Cl.
*H04N 5/272* (2006.01)
*H04N 5/262* (2006.01)
(Continued)

(52) U.S. Cl.
CPC ............ *H04N 5/272* (2013.01); *H04N 5/2628* (2013.01); *H04N 9/735* (2013.01); *H04N 13/271* (2018.05)

(58) Field of Classification Search
CPC .... H04N 5/272; H04N 13/271; H04N 5/2628; H04N 9/735; H04N 5/64; G06T 19/00
(Continued)

(56) References Cited

U.S. PATENT DOCUMENTS

2012/0229508 A1* 9/2012 Wigdor .................. G06F 3/147
345/633
2015/0227196 A1* 8/2015 Fujii ...................... G06F 3/011
345/156
(Continued)

FOREIGN PATENT DOCUMENTS

JP 2014-090386 A 5/2014
JP 2014-515130 A 6/2014
(Continued)

*Primary Examiner* — Susan E. Hodges
(74) *Attorney, Agent, or Firm* — Paratas Law Group, PLLC

(57) ABSTRACT

An information processing apparatus, an information processing method, and a program that are capable of adaptively displaying a video corresponding to sensed three-dimensional information in a space in which the video is displayed. The information processing apparatus includes: a determination unit that determines a setting related to display of a video when the video corresponding to first three-dimensional information sensed in a first real space is displayed in a second real space, on the basis of a sensing result in the second real space.

19 Claims, 17 Drawing Sheets

(51) Int. Cl.
  *G06T 19/00*    (2011.01)
  *G06F 3/01*     (2006.01)
  *H04N 13/271*   (2018.01)
  *H04N 9/73*     (2006.01)

(58) Field of Classification Search
  USPC .......................................................... 348/43
  See application file for complete search history.

(56)         References Cited

U.S. PATENT DOCUMENTS

2015/0227222 A1\* 8/2015 Sako ................. G06F 3/011
                                                345/173
2016/0300387 A1\* 10/2016 Ziman .................... H04N 7/157
2018/0129050 A1\* 5/2018 Hayashi ............... G09B 21/008

FOREIGN PATENT DOCUMENTS

JP          2015-116336 A    6/2015
WO    WO 2014/027681 A1    2/2014

\* cited by examiner

FIG. 5

| MOVING IMAGE ID 1260 | DEVICE ID 1262 | TITLE 1264 | THUMBNAIL 1266 | RECORDING PERSON 1268 | PHOTOGRAPHING DATE AND TIME 1270 | PHOTOGRAPHING POSITION AND POSTURE 1272 | SYNCHRONOUSLY PHOTOGRAPHED MOVING IMAGE 1274 |
|---|---|---|---|---|---|---|---|
| 1001 | X1Y2 | AAA01 | ... | ABC | 2016/11/1 13:00 | ... | — |
| 1002 | A55B | BBBCC | ... | DEF | 2016/11/15 10:30 | ... | 2001 |
| 1003 | Z246 | DDD | ... | XYZ | 2016/11/20 18:20 | ... | 3123 |
| ... | ... | ... | ... | ... | ... | ... | ... |

1248

INFORMATION PROCESSING APPARATUS, INFORMATION PROCESSING METHOD, AND PROGRAM CAPABLE OF ADAPTIVELY DISPLAYING A VIDEO CORRESPONDING TO SENSED THREE-DIMENSIONAL INFORMATION

CROSS REFERENCE TO PRIOR APPLICATION

This application is a National Stage Patent Application of PCT International Patent Application No. PCT/JP2017/037442 (filed on Oct. 17, 2017) under 35 U.S.C. §371, which claims priority to Japanese Patent Application No. 2017-005077 (filed on Jan. 16, 2017), which are all hereby incorporated by reference in their entirety.

TECHNICAL FIELD

The present disclosure relates to an information processing apparatus, an information processing method, and a program.

BACKGROUND ART

Conventionally, various technologies for displaying images photographed in the past in association with the real world such as augmented reality (AR), for example, have been developed.

For example, the following Patent Document 1 discloses a technology in which a head mounted display (HMD) displays a title image of a moving image in a case where it is judged that the moving image photographed at a current position of the HMD exists.

CITATION LIST

Patent Document

Patent Document 1: Japanese Patent Application Laid-Open No. 2014-90386

SUMMARY OF THE INVENTION

Problems to be Solved by the Invention

However, in the technology disclosed in Patent Document 1, it has not been considered to display a video corresponding to three-dimensional information sensed in the real space.

Therefore, the present disclosure proposes a new and improved information processing apparatus capable of adaptively displaying a video corresponding to sensed three-dimensional information in a space in which the video is displayed, an information processing method, and a program.

Solutions to Problem

According to the present disclosure, provided is an information processing apparatus including a determination unit that determines a setting related to display of a video when the video corresponding to first three-dimensional information sensed in a first real space is displayed in a second real space, on the basis of a sensing result in the second real space.

Furthermore, according to the present disclosure, provided is an information processing method including determining, by a processor, a setting related to display of a video when the video corresponding to first three-dimensional information sensed in a first real space is displayed in a second real space, on the basis of a sensing result in the second real space.

Furthermore, according to the present disclosure, provided is a program for causing a computer to function as a determination unit that determines a setting related to display of a video when the video corresponding to first three-dimensional information sensed in a first real space is displayed in a second real space, on the basis of a sensing result in the second real space.

Effects of the Invention

As described above, according to the present disclosure, it is possible to adaptively display a video corresponding to sensed three-dimensional information in a space where the video is displayed. Note that the effects described herein are not necessarily limited, and any of the effects described in the present disclosure may be applied.

BRIEF DESCRIPTION OF DRAWINGS

FIG. 5 is an explanatory diagram showing a configuration example of meta information 1248 according to the same embodiment.

MODE FOR CARRYING OUT THE INVENTION

Figure 1:
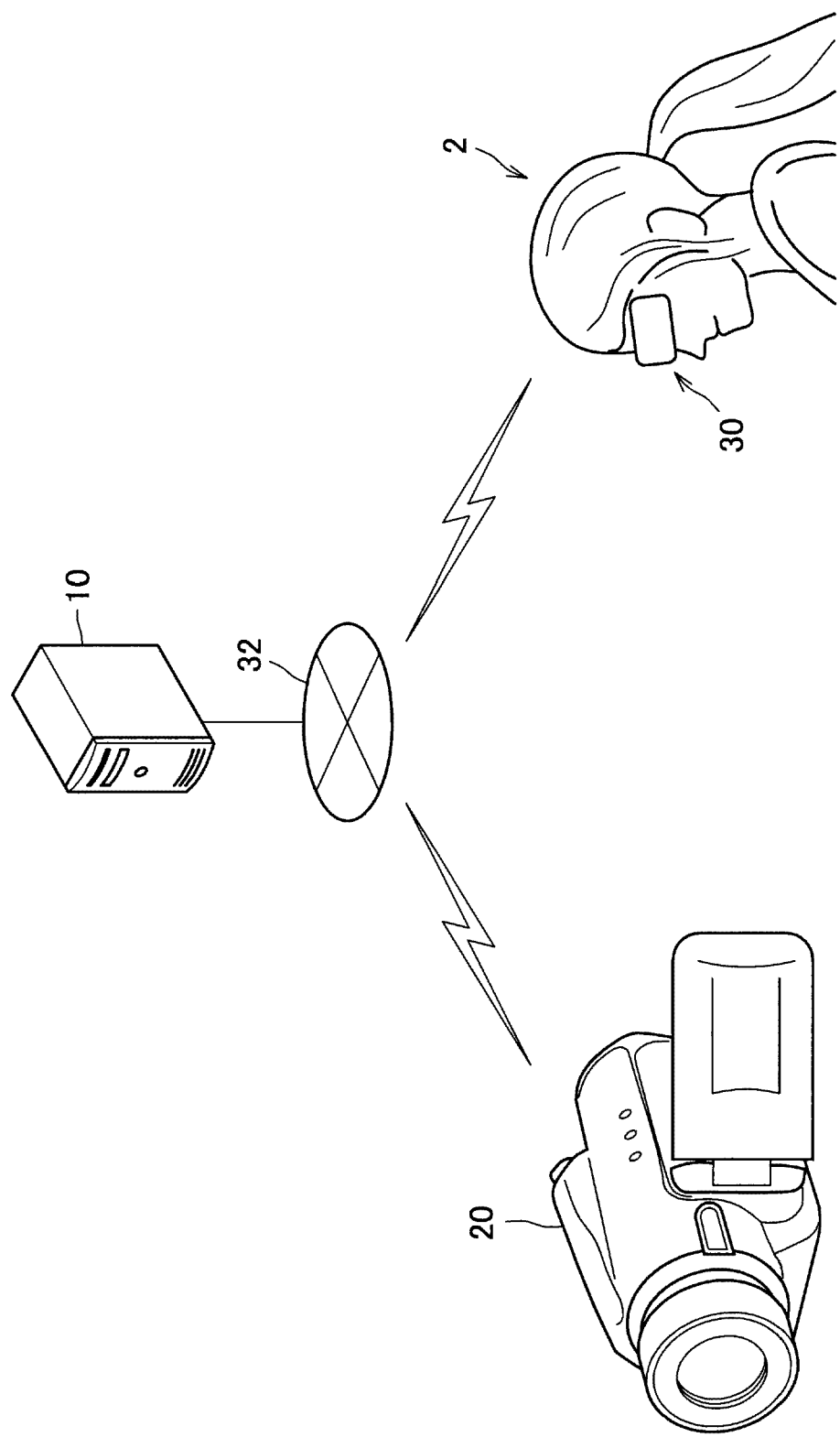
FIG. 1 is an explanatory diagram showing a configuration example of an information processing system according to an embodiment of the present disclosure.

Preferred embodiments of the present disclosure will be described in detail below with reference to the accompanying drawings. Note that, in the present specification and the drawings, the same reference numerals are given to the constituent elements having substantially the same functional configuration, and redundant explanations are omitted.

Furthermore, in this specification and the drawings, a plurality of constituent elements having substantially the same functional configuration may be distinguished by attaching different alphabets after the same reference numerals. For example, a plurality of configurations having substantially the same functional configuration is distinguished like the server 10a and the server 10b as necessary. However, in a case where it is not necessary to particularly distinguish each of a plurality of constituent elements having substantially the same functional configuration, only the same reference numerals are attached. For example, in a case where there is no need to particularly distinguish between the server 10a and the server 10b, it is simply referred to as a server 10.

Furthermore, the "mode for carrying out the invention" will be described according to the order of items shown below.

1. Configuration of Information Processing System
2. Detailed Description of Embodiment
3. Hardware Configuration
4. Modification <<1. Configuration of Information Processing System>>

First, a configuration example of an information processing system according to an embodiment of the present disclosure will be described with reference to FIG. 1. As shown in FIG. 1, the information processing system according to the present embodiment has a server 10, a recording device 20, a reproduction device 30 used by a viewer/listener 2, and a communication network 32.

1-1. RECORDING DEVICE 20

The recording device 20 is a device for recording depth information and moving images of real space. The recording device 20 may include a camera (RGB camera). Then, the recording device 20 can take a moving image on the basis of, for example, a user's operation, or the like. For example, the recording device 20 takes a moving image by focusing light to an imaging element included in a camera via a lens included in the camera.

Furthermore, the recording device 20 may include a depth sensor, a stereo camera, a range finder, or the like. Then, the recording device 20 can sequentially record a depth map (depth information) in front of the recording device 20 at predetermined time intervals, for example.

Furthermore, the recording device 20 may include a position information acquisition unit (not shown). The position information acquisition unit may include a receiver that receives a positioning signal from a positioning satellite such as the global positioning system (GPS), the global navigation satellite system (GLONASS), Galileo, BeiDou, or Michibiki, for example. Note that the position information acquisition unit can receive a positioning signal also from one type of satellite, or can receive a positioning signal also from a plurality of types of satellites and combine the received signals to position the current position.

Furthermore, the position information acquisition unit may include, for example, a communication antenna, a network card, or the like. In this case, the position information acquisition unit can acquire the current position information by receiving position information from, for example, a Bluetooth (registered trademark) access point, a Wi-Fi (registered trademark) access point, an RFID tag, or the like. Alternatively, the position information acquisition unit can acquire the current position information by receiving IDs of these devices, then, inquiring position information corresponding to the IDs to a predetermined device (not shown), and acquiring the position information from the predetermined device.

Furthermore, the recording device 20 can further estimate the own position of the recording device 20 by using a technique such as simultaneous localization and mapping (SLAM), for example. For example, the recording device 20 recognizes a specific object located around the recording device 20 on the basis of an image photographed by the camera of the recording device 20 or the like, and then, acquires the position information of the object from, for example, a predetermined device, to estimate the own position of the recording device 20.

Here, depth information and a recording method of a moving image by the recording device 20 will be described in more detail. For example, the recording device 20 simultaneously records a moving image and a depth map, and records the position information at the time of recording in association with the moving image. Moreover, the recording device 20 may record meta information in association with the moving image and the depth map. As an example, the recording device 20 collects the taken moving image, the sensed depth map, and the meta information as one file collectively. Here, the meta information includes, for example, an ID of the moving image, a title, a thumbnail, a name of a recording person, date and time of recording, position information at the time of recording, posture information of the recording device 20 at the time of recording, or the like.

Furthermore, the recording device 20 may have a function of communicating with another device by wired communication or wireless communication. For example, the recording device 20 transmits the taken moving image and the depth map and meta information associated with the moving image to the server 10 via the communication network 32 as described later, on the basis of the operation of the user.

1-2. SERVER 10

The server 10 is an example of an information processing apparatus according to the present disclosure. The server 10 is a device for managing information such as a moving image recorded by the recording device 20. For example, the server 10 associates and manages the received moving image, depth map, and meta information.

Furthermore, the server 10 may have a function of communicating with another device via the communication network 32, for example. For example, the server 10 transmits, to the reproduction device 30, a moving image and a depth map corresponding to an acquisition request on the basis of an acquisition request of a moving image received from the reproduction device 30 as described later.

1-3. REPRODUCTION DEVICE 30

The reproduction device 30 is a device for displaying a video corresponding to a moving image and a depth map recorded by the recording device 20. For example, the reproduction device 30 requests the server 10 to provide a moving image and a depth map recorded in the vicinity of the current position information (of the reproduction device 30). Then, the reproduction device 30 displays the video corresponding to the moving image and the depth map received from the server 10.

The reproduction device 30 may be, for example, a head-mounted device such as an HMD. Note that the HMD may be an optical see-through type device or a video transmission type device. In the latter case, the reproduction device 30 has a camera for taking a video in front of the reproduction device 30, and then, can sequentially display videos taken by the camera on a display unit 326 as described later. As a result, the user can see the scenery ahead of the user via the video displayed on the display unit 326.

Note that the present invention is not limited to such an example, and the reproduction device 30 may be, for example, a predetermined portable device having a display such as a liquid crystal display (LCD) or an organic light emitting diode (OLED). For example, the predetermined portable device may be a mobile phone such as a smartphone, a tablet type terminal, or a portable music player.

1-4. COMMUNICATION NETWORK 32

The communication network 32 is a wired or wireless transmission path of information transmitted from a device connected to the communication network 32. For example, the communication network 32 may include a public network such as a telephone network, the Internet, or a satellite communication network, various local area network (LAN) including Ethernet (registered trademark), a wide area network (WAN), or the like. Furthermore, the communication network 32 may include a dedicated network such as an Internet protocol-virtual private network (IP-VPN).

1-5. SUMMARY OF PROBLEMS

The configuration of the information processing system according to the present embodiment has been described above. Incidentally, various techniques related to virtual reality (VR) have been conventionally developed. According to this technique, by allowing a viewer/listener to view a video of a virtual space, it is possible to present the viewer/listener with experience of entering the virtual space.

However, with the conventional technology, it is not possible to superimpose the taken moving image or the like on the space where the viewer/listener is located. Therefore, according to the conventional technology, the viewer/listener hardly obtains the realistic feeling due to a reason that the viewer/listener's body is not displayed, for example.

Therefore, with the above circumstances as one point of view, the server 10 according to the present embodiment has created. The server 10 according to the present embodiment determines the setting related to the display of the video when the video corresponding to the moving image and the depth map sensed by the recording device 20 is displayed by the reproduction device 30, on the basis of the sensing result in the space where the reproduction device 30 is located. Therefore, for example, the server 10 can cause the reproduction device 30 to display the video optimized for the space where the reproduction device 30 is located.

2. DETAILED DESCRIPTION OF EMBODIMENT

2-1. CONFIGURATION: REPRODUCTION DEVICE 30

Figure 2:
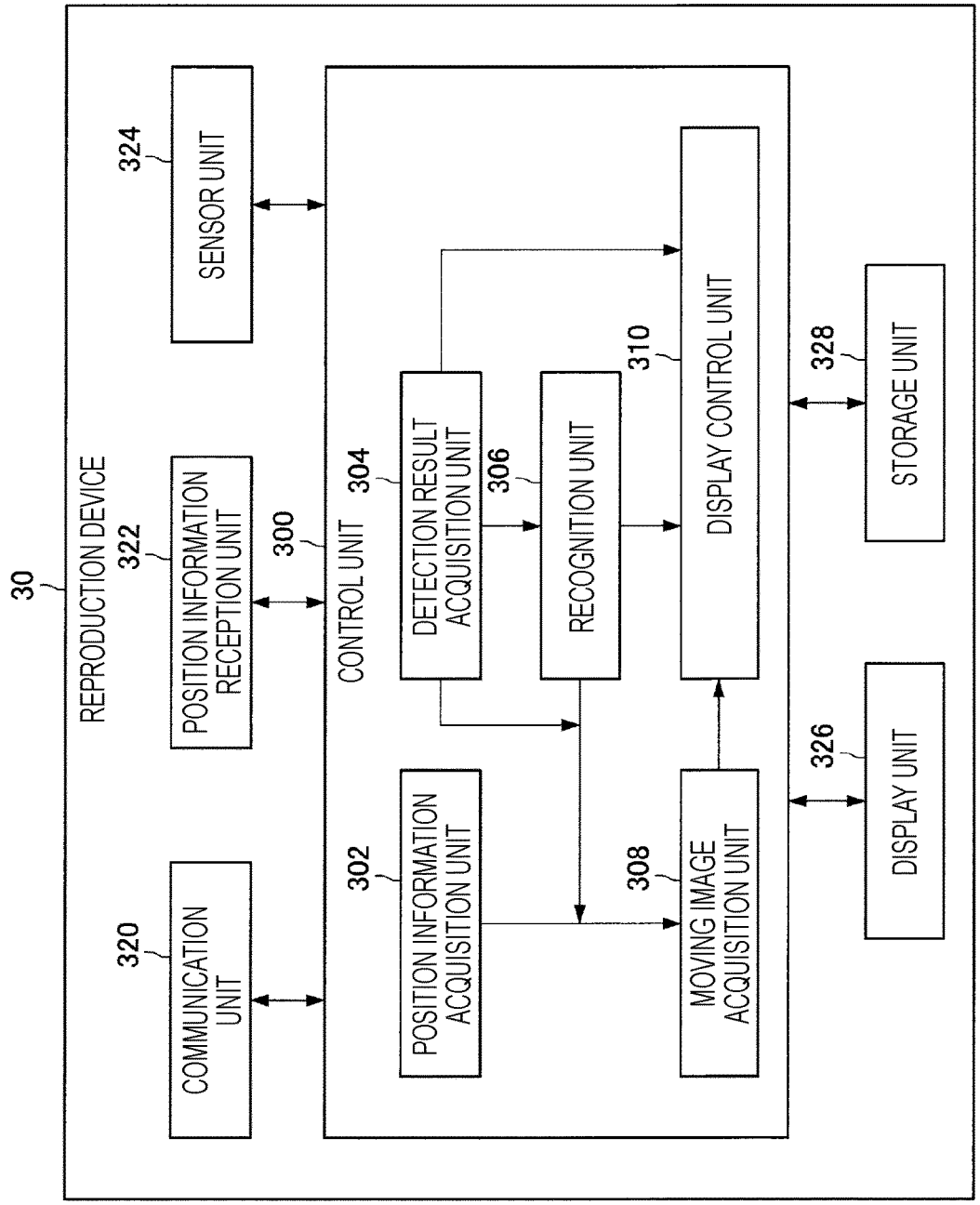
FIG. 2 is a functional block diagram showing a configuration example of a reproduction device 30 according to the same embodiment.

Next, the configuration of the reproduction device 30 according to the present embodiment will be described in detail. FIG. 2 is a functional block diagram showing a configuration example of the reproduction device 30 according to the present embodiment. As shown in FIG. 2, the reproduction device 30 has a control unit 300, a communication unit 320, a position information reception unit 322, a sensor unit 324, a display unit 326, and a storage unit 328.

2-1-1. Control Unit 300

The control unit 300 may include a processing circuit such as a central processing unit (CPU) or a graphics processing unit (CPU), for example. The control unit 300 comprehensively controls the operation of the reproduction device 30. Furthermore, as shown in FIG. 2, the control unit 300 has a position information acquisition unit 302 a detection result acquisition unit 304, a recognition unit 306, a moving image acquisition unit 308, and a display control unit 310.

2-1-2. Position Information Acquisition Unit 302

The position information acquisition unit 302 acquires the current position information of the reproduction device 30 on the basis of the measurement result by the position information reception unit 322 as described later and the sensing result by the sensor unit 324 as described later. For example, the position information acquisition unit 302 specifies the current position information on the basis of the positioning signal from one type of satellite being received by the position information reception unit 322. Alternatively, the position information acquisition unit 302 can specify the current position information on the basis of a combination of positioning signals received from a plurality of types of satellites.

Furthermore, in a case where a transmitter ID is received by the position information reception unit 322, the position information acquisition unit 302 can inquire the position information corresponding to the transmitter ID to, for example, a predetermined device, and acquire the position information to acquire the current position information.

Furthermore, the position information acquisition unit 302 can also estimate the own position of the reproduction device 30 by using the sensing result by the sensor unit 324 and a technique such as SLAM, for example. For example, the position information acquisition unit 302 first recognizes a specific object located around the reproduction device 30 on the basis of an image photographed by the sensor unit 324, a sensed depth map, or the like. Then, the position information acquisition unit 302 acquires the position information of the object from, for example, a predetermined device to estimate the own position of the reproduction device 30.

2-1-3. Detection Result Acquisition Unit 304

The detection result acquisition unit 304 acquires the sensing result by the sensor unit 324. For example, the detection result acquisition unit 304 acquires the image photographed by the sensor unit 324, the sensed depth map, and the sensed posture, acceleration, or the like (of the reproduction device 30).

2-1-4. Recognition Unit 306

The recognition unit 306 performs various types of recognition processing on the basis of the sensing result acquired by the detection result acquisition unit 304. For example, the recognition unit 306 sequentially recognizes the line-of-sight direction of the user on the basis of the image of the eye of a user (hereinafter, referred to as a viewer/listener in some cases) using the reproduction device 30, which is photographed by the sensor unit 324. Furthermore, the detection result acquisition unit 304 sound-recognizes the viewer/listener's utterance collected by the sensor unit 324, and then, analyzes the meaning of the recognition result.

2-1-5. Moving Image Acquisition Unit 308

The moving image acquisition unit 308 acquires a moving image and a depth map corresponding to the position information acquired by the position information acquisition unit 302 from the server 10. For example, the moving image acquisition unit 308 causes the communication unit 320 to transmit an acquisition request of the moving image including the acquired position information to the server 10, to acquire the moving image corresponding to the position information and the depth map associated with the moving image from the server 10. Here, the acquisition request of the moving image may further include information regarding the posture of the reproduction device 30 acquired by the detection result acquisition unit 304, a recognition result by the recognition unit 306, or the like.

2-1-6. Display Control Unit 310

The display control unit 310 causes the display unit 326 to display the moving image acquired by the moving image acquisition unit 308 and the video corresponding to the depth map. For example, the display control unit 310 first constructs three-dimensional data on the basis of the acquired moving image and depth map. Then, the display control unit 310 determines the video to be displayed on the display unit 326 on the basis of the three-dimensional data, and the position information and the posture information of the display unit 326, and causes the display unit 326 to display the video.

2-1-7. Communication Unit 320

The communication unit 320 may include, for example, a communication antenna, a network card, or the like. The communication unit 320 transmits and receives information to and from other devices. For example, the communication unit 320 transmits an acquisition request of the moving image to the server 10 under the control of the moving image acquisition unit 308. Furthermore, the communication unit 320 receives the moving image and the depth map from the server 10.

2-1-8. Position Information Reception Unit 322

The position information reception unit 322 may include a receiver that receives positioning signals from positioning satellites such as GPS, GLONASS, Galileo, BeiDou, or Michibiki, for example. Note that the position information reception unit 322 can receive a positioning signal also from one type of satellite, or can receive a positioning signal also from a plurality of types of satellites and combine the received signals to position the current position.

Furthermore, the position information reception unit 322 may include, for example, a communication antenna, a network card, or the like. For example, the position information reception unit 322 can acquire the current position information by receiving position information from, for example, a Bluetooth access point, a Wi-Fi access point, or an RFID tag. Alternatively, the position information reception unit 322 can acquire the current position information by receiving IDs of these devices (transmitter), inquiring position information corresponding to the IDs to a predetermined device (not shown), and acquiring the position information from the predetermined device.

2-1-9. Sensor Unit 324

The sensor unit 324 may include, for example, a camera (image sensor), a depth sensor, a microphone, an acceleration sensor, a gyroscope, a geomagnetic sensor, or the like. For example, the sensor unit 324 photographs an image of an external environment (for example, the front of the reproduction device 30, or the like) and senses a depth map. Furthermore, the sensor unit 324 collects sound in the external environment. Furthermore, the sensor unit 324 senses the posture, acceleration, or the like of the reproduction device 30.

2-1-10. Display Unit 326

The display unit 326 displays a video under the control of the display control unit 310. For example, the display unit 326 may have an image projection device, and the reproduction device 30 may have a left eye lens and a right eye lens (or a goggle type lens). In this case, the image projection device projects a video with at least a partial region of each of the left eye lens and the right eye lens (or the goggle type lens) as the projection plane. Note that the left eye lens and the right eye lens (or the goggle type lens) can be formed, for example, by a transparent material such as resin or glass.

Alternatively, the display unit 326 may have a liquid crystal panel and the transmittance of the liquid crystal panel may be controlled. As a result, the display unit 326 can be controlled to a transparent or translucent state.

Alternatively, the display unit 326 may be configured as a non-transmissive display device and may sequentially display videos of the user's line-of-sight direction taken by the sensor unit 324. For example, the display unit 326 may include a liquid crystal display (LCD) or an organic light emitting diode (OLED).

2-1-11. Storage Unit 328

The storage unit 328 stores various pieces of data and various types of software.

2-2. CONFIGURATION: SERVER 10

Figure 3:
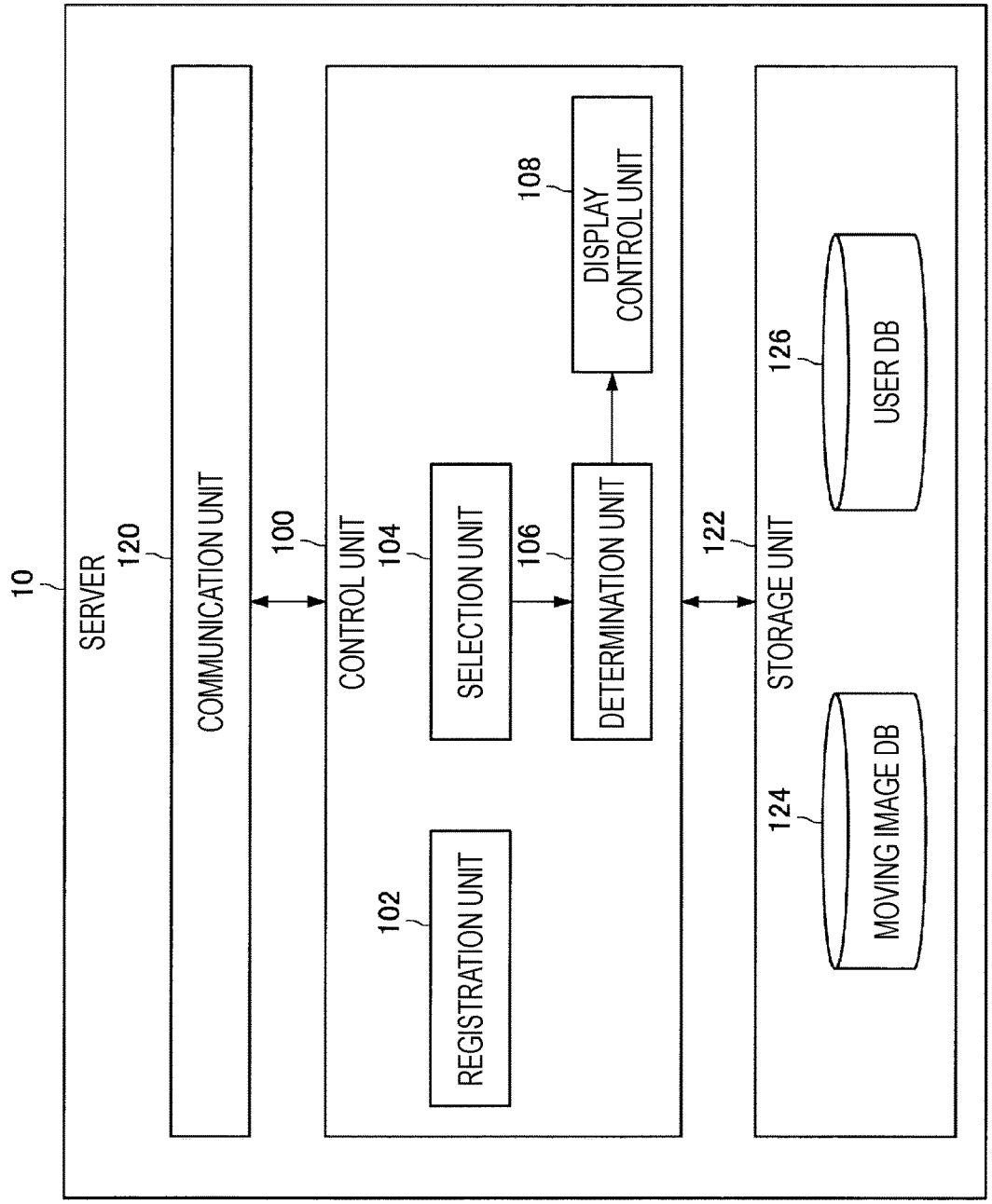
FIG. 3 is a functional block diagram showing a configuration example of a server 10 according to the same embodiment.

Next, the configuration of the server 10 according to the present embodiment will be described in detail. FIG. 3 is a functional block diagram showing a configuration example of the server 10 according to the present embodiment. As shown in FIG. 3, the server 10 includes a control unit 100, a communication unit 120, and a storage unit 122.

2-2-1. Control Unit 100

The control unit 100 may include a processing circuit such as a CPU 150 or a CPU as described later, for example. The control unit 100 comprehensively controls the operation of the server 10. Furthermore, as shown in FIG. 3, the control unit 100 includes a registration unit 102, a selection unit 104, a determination unit 106, and a display control unit 108.

2-2-2. Registration Unit 102

The registration unit 102 registers a moving image, a depth map, meta information, and the like received from the recording device 20, in a moving image DB 124. For example, every time a moving image or a depth map is acquired from the recording device 20, the registration unit 102 sequentially registers the moving image and the depth map in the moving image DB 124.

Moving Image DB 124

Figure 4:
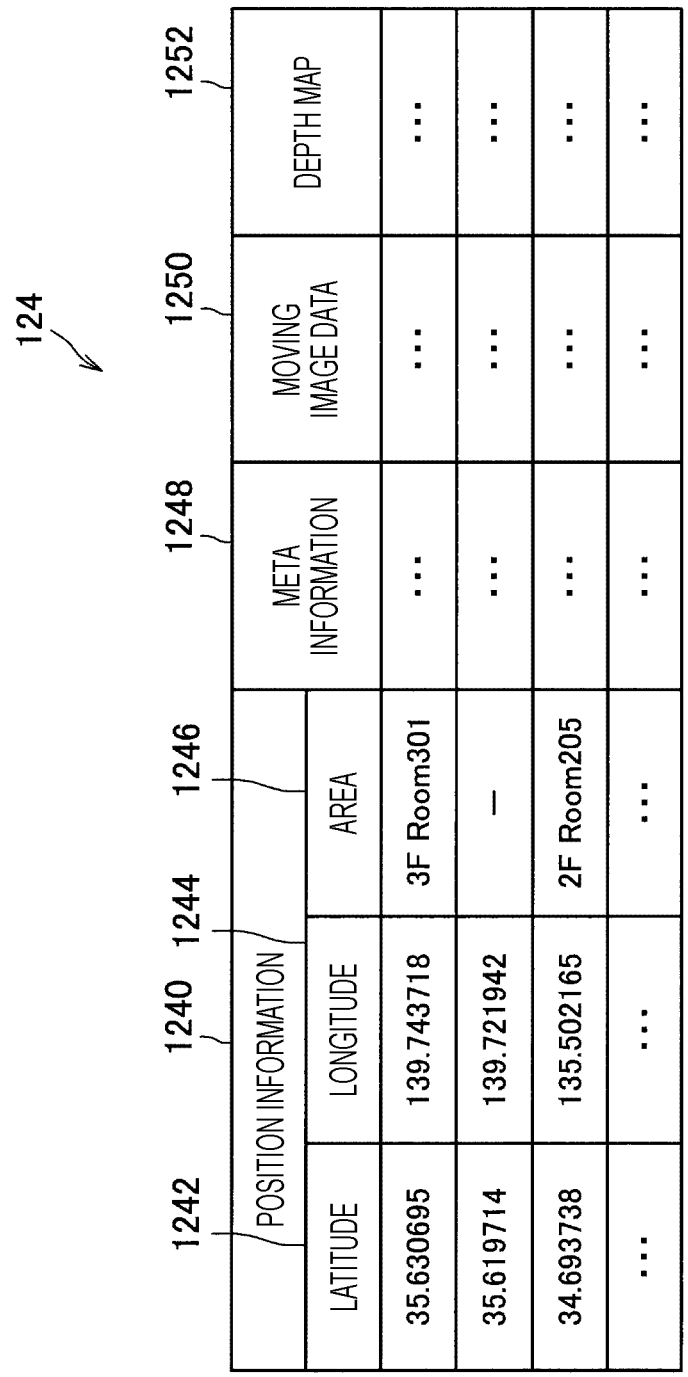
FIG. 4 is an explanatory diagram showing a configuration example of a moving image DB 124 according to the same embodiment.

FIG. 4 is an explanatory diagram showing a configuration example of the moving image DB 124. As shown in FIG. 4, for example, position information 1240, meta information 1248, moving image data 1250, and a depth map 1252 are associated with the moving image DB 124. Here, in the position information 1240, the position information in which the corresponding moving image and the depth map are recorded is stored. Furthermore, as shown in FIG. 4, the position information 1240 includes, for example, a latitude 1242, a longitude 1244, an area 1246, or the like. The Latitude 1242 and the longitude 1244 store latitude and longitude in which the corresponding moving image and depth map are recorded, respectively. Furthermore, in an area 1246, for example, a specific position in a facility (for example, a floor, the number of a room, or the like in a facility) in which the corresponding moving image and the depth map are recorded is stored.

Furthermore, the meta information 1248 stores meta information associated with the corresponding moving image. Note that details of the meta information 1248 will be described later. Furthermore, the moving image data 1250 stores data (file) of the corresponding moving image. Furthermore, a depth map sensed in association with the corresponding moving image is stored in the depth map 1252.

Here, referring to FIG. 5, details of the meta information 1248 will be described. As shown in FIG. 5, the meta information 1248 includes, for example, a moving image ID 1260, a device ID 1262, a title 1264, a thumbnail 1266, a recording person 1268, a photographing date and time 1270, a photographing position and posture 1272, and a synchronously photographed moving image 1274. Here, the moving image ID 1260 stores the ID assigned to the corresponding moving image. Furthermore, the device ID 1262 stores identification information of the recording device 20 that has photographed the corresponding moving image. Furthermore, the title 1264 stores a title given by, for example, a recording person for the corresponding moving image. Furthermore, the thumbnail 1266 stores a thumbnail of the corresponding moving image. Furthermore, the recording person 1268 stores identification information (such as a name) of a person who recorded the corresponding moving image. Furthermore, the photographing date and time 1270 stores the photographing date and time of the corresponding moving image. Furthermore, the photographing position and posture 1272 stores position information and posture information at the time of photographing of the corresponding moving image. Furthermore, the synchronously photographed moving image 1274 stores the presence or absence of another moving image synchronously photographed with the corresponding moving image, an ID of the another moving image (in a case where another moving image exists), or the like.

2-2-3. Selection Unit 104

2-2-3-1. Selection Based on Position Information

Selection Example 1

The selection unit 104 selects a moving image to be reproduced from the moving image DB 124 on the basis of the acquisition request of the moving image received from the reproduction device 30. For example, the selection unit 104 selects a moving image to be reproduced from the moving image DB 124 on the basis of the received position information and posture information included in the acquisition request of the moving image. As an example, the selection unit 104 may select, as the moving image to be reproduced, a moving image photographed closest to the position information included in the received acquisition request, from among the plurality of moving images stored in the moving image DB 124. Alternatively, the selection unit 104 may search, in the moving image DB 124, an image having the smallest combination of the difference between the position information included in the received acquisition request and the position information at the time of shooting, and the difference of the posture information included in the acquisition request and the posture information at the time of photographing included in the received acquisition request, and select the specified moving image as the moving image to be reproduced.

Selection Example 2

Alternatively, the selection unit 104 can select a moving image designated by the viewer/listener from among a plurality of moving images associated with position information within a predetermined range from the position information included in the received acquisition request of the moving image, as the moving image to be reproduced. For example, the selection unit 104 first selects all moving images associated with position information within a predetermined range from the received position information from the moving image DB 124 as a candidate for the moving image to be reproduced. Subsequently, the selection unit 104 causes the communication unit 120 to transmit the meta information of each of the selected candidate for moving image to be reproduced to the reproduction device 30.

In this case, with respect to each candidate for the moving image to be reproduced, for example, the reproduction device 30 can display the title, thumbnail, and the like of the moving image on the display unit 326 in association with the position information in which the moving image is photographed. Then, for example, in a case where it is detected that the reproduction device 30 has approached the location indicated by any one of the position information associated with each of the candidates for the moving image to be reproduced, the selection unit 104 may select a moving image corresponding to the position information as the moving image to be reproduced. Alternatively, in a case where pieces of position information associated with each of the candidates for the moving image to be reproduced are located within a predetermined range (that is, closely collected), and it is recognized that the reproduction device 30 has moved to within the predetermined range, the selection unit 104 may select a moving image corresponding to the detected instruction of the user (for example, a hand gesture, a sound command, or the like), among the candidates for the moving image to be reproduced, as the moving image to be reproduced. Note that, as a modification, in this case, the selection unit 104 can also select all candidates for the moving image to be reproduced as the moving images to be reproduced.

2-2-3-2. Selection Based on Other Information

Alternatively, in a case where designation information (for example, a search keyword of a moving image, or the like) of the user is included in the received acquisition request of the moving image, the selection unit 104 selects a moving image corresponding to the designation information as the moving image to be reproduced from the moving image DB 124. Note that in a case where there are a plurality of moving images corresponding to the designation information, the selection unit 104 may select any one of the plurality of moving images as the moving image to be reproduced, or may select all the plurality of moving images (reproduced at the same time) as the moving images to be reproduced.

2-2-3-3. Dynamic Switching

Switching Example 1

Furthermore, the selection unit 104 can dynamically switch the moving image being reproduced by the reproduction device 30 to another moving image. For example, the selection unit 104 dynamically selects a moving image different from the moving image being reproduced as the moving image to be reproduced, on the basis of the change in the position information sensed by the reproduction device 30.

For example, each time the sensing result of the position information and the posture information of the reproduction device 30 are acquired, the selection unit 104 sequentially calculates an evaluation value (indicating what extent the corresponding moving image is displayed appropriately) for each of the plurality of moving images associated with the vicinity of the position information. Then, in a case where the evaluation value of any other moving image is larger than that of the moving image currently being reproduced, the selection unit 104 dynamically switches the moving image being reproduced to another moving image having the maximum evaluation value.

Here, for example, the evaluation value of each moving image can be calculated such that the smaller the difference between the combination of the position information and the posture information of the reproduction device 30 and the combination of the position information and the posture information at the time of photographing of the moving image is, the larger the evaluation value is. Furthermore, the evaluation value of each moving image may vary depending on the distance between the photographed subject and the recording device 20. For example, even if the displacement between the position at the time of photographing and the position at the time of reproduction is the same, the evaluation value is calculated to be smaller as the moving image has larger distance between the position at the time of photographing and the subject (that is, at the time of photographing of a distant scene). Note that, in general, in a case where the reproduction device 30 moves in the photographing direction, the divergence between the photographed moving image and the photographed image of the front of the reproduction device 30 by the camera tends to be small. Therefore, with respect to each moving image, the elliptical region extending in the photographing direction from the position of the recording device 20 at the time of photographing of the moving image can be calculated with a higher evaluation value than the other regions.

Switching Example 2

Note that if the moving image to be reproduced frequently switches, the viewer/listener can perceive it unnaturally. Therefore, the selection unit 104 may have hysteresis and switch the moving image being reproduced to another moving image. For example, only in a case where the length of the duration of the state in which the calculated evaluation value of any other moving image is larger than that of the moving image currently reproduced, the selection unit 104 may switch the moving image being reproduced to another moving image having the maximum evaluation value.

2-2-4. Determination Unit 106

The determination unit 106 determines the setting related to the display of the video when the video corresponding to the moving image to be reproduced selected by the selection unit 104 is displayed by the reproduction device 30 on the basis of a predetermined criterion. For example, the determination unit 106 determines the setting related to the display of the video on the basis of the received acquisition request of the moving image.

2-2-4-1. Alignment

Here, the display condition may include a display position and orientation when the moving image to be reproduced is displayed by the reproduction device 30. For example, the determination unit 106 determines the position and orientation at which the moving image to be reproduced is displayed on the basis of a comparison between the depth map included in the acquisition request and the depth map associated with the moving image to be reproduced. As an example, the determination unit 106 adjusts the display position and orientation of the moving image so that the common planes specified from the depth map included in the acquisition request and the depth map associated with the moving image coincide, to determine the display the moving image to be reproduced. Furthermore, the determination unit 106 adjusts the display position and orientation of the moving image so that a part of a plurality of feature points specified from the depth map included in the acquisition request, and a part of a plurality of feature points specified from the depth map associated with the moving image coincide, to determine the display the moving image to be reproduced.

2-2-4-2. Determination of Display Region

Furthermore, the display condition described above may include a display region in which the corresponding moving image is displayed in the real space where the reproduction device 30 is located. In this case, the determination unit 106 can determine the display region on the basis of the depth map included in the acquisition request.

(a) Use of Detection Result of Plane

For example, the determination unit 106 determines the display region of the corresponding moving image on the basis of the plane specified from the depth map included in the acquisition request. Moreover, the determination unit 106 can determine the display region of the corresponding moving image on the basis of the vertical direction (gravity direction) specified from the depth map included in the acquisition request. For example, the determination unit 106 determines a predetermined three-dimensional space based on any plane specified from the depth map included in the acquisition request and the vertical direction specified from the depth map, as the display region of the corresponding moving image.

More specifically, the determination unit 106 first calculates a point cloud on the basis of the depth map included in the acquisition request, and then, uses an algorithm such as RANSAC, for example, to calculate all closed planes on the basis of the point cloud. Note that, at this time, the determination unit 106 may remove the noise in the time direction (with regard to the corresponding moving image) using a time-series filter. Furthermore, the determination unit 106 may detect the three-dimensional space instead of the plane.

Subsequently, the determination unit 106 determines any of the detected all closed planes as the display region of the corresponding moving image, on the basis of a predetermined index (for example, the size, shape, position, distance from the viewer/listener, or the like). For example, the determination unit 106 determines, for example, the closed plane that satisfies one or more of conditions that the size of the closed plane is equal to or larger than a predetermined size, that the distance from the viewer/listener is a predetermined distance or more, that the facing direction is faced to the viewer/listener, that the aspect ratio is within a preset range, and the like, as the display region of the corresponding moving image.

(b) Determination by GUI

Furthermore, the determination unit 106 can also determine the display region of the corresponding moving image on the basis of the depth map included in the acquisition request and the detection result of the viewer/listener's operation on the GUI displayed by the reproduction device 30. Note that the GUI is an example of an operation image according to the present disclosure.

Display Example 1

Figure 6:
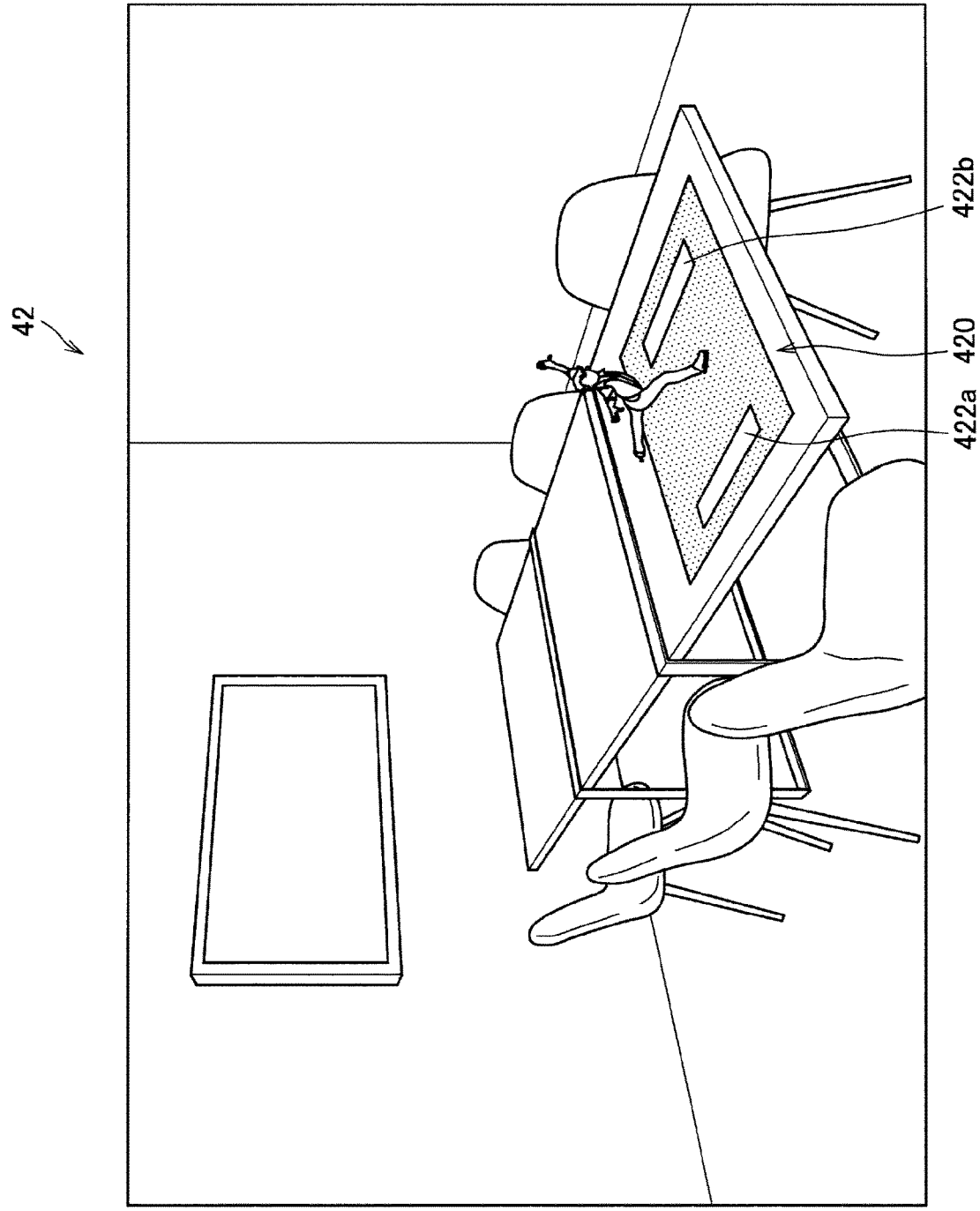
FIG. 6 is a diagram showing a display example of a graphical user interface (GUI) for designating a display region of a video to be reproduced according to the same embodiment.

FIG. 6 is an explanatory diagram showing a display example of a GUI. Note that, in the example shown in FIG. 6, the reproduction device 30 is located in a certain room, and a GUI 420 as shown in FIG. 6 is displayed on the top surface of the table of the display unit 326 of the reproduction device 30.

As shown in FIG. 6, in environment 42 the GUI 420 includes a handle GUI 422*a* and a handle GUI 422*b* (collectively referred to as a handle GUI 422. In the example shown in FIG. 6, in a case where it is recognized that the viewer/listener's gesture of hand griping the handle GUI 422 is performed, the determination unit 106 changes the current setting mode to the resize mode. In this resize mode, the region of the GUI 420 may be moved in parallel, changed in scale, or rotated on the basis of the detection result of the change of the position of the hand gripping the handle GUI 422 (for example, moving the hand, changing the interval between the hands, or the like). Note that the server 10 (the determination unit 106) may determine the contact between the handle GUI 422 and the hand of the viewer/listener using the coordinates in the three-dimensional space, or using the coordinate system of the screen (screen coordinate system) displayed on the display unit 326. According to the latter decision method, even in a case where the handle GUI 422 is located far away from the viewer/listener in the corresponding real space, the viewer/listener can easily operate the GUI 420.

Furthermore, for example, when a gesture to release a hand from the handle GUI 422 is detected, the determination unit 106 ends the resize mode. Then, the determination unit 106 determines the region of the GUI 420 at the end of the resize mode as the display region of the corresponding moving image.

Display Example 2

Figure 7:
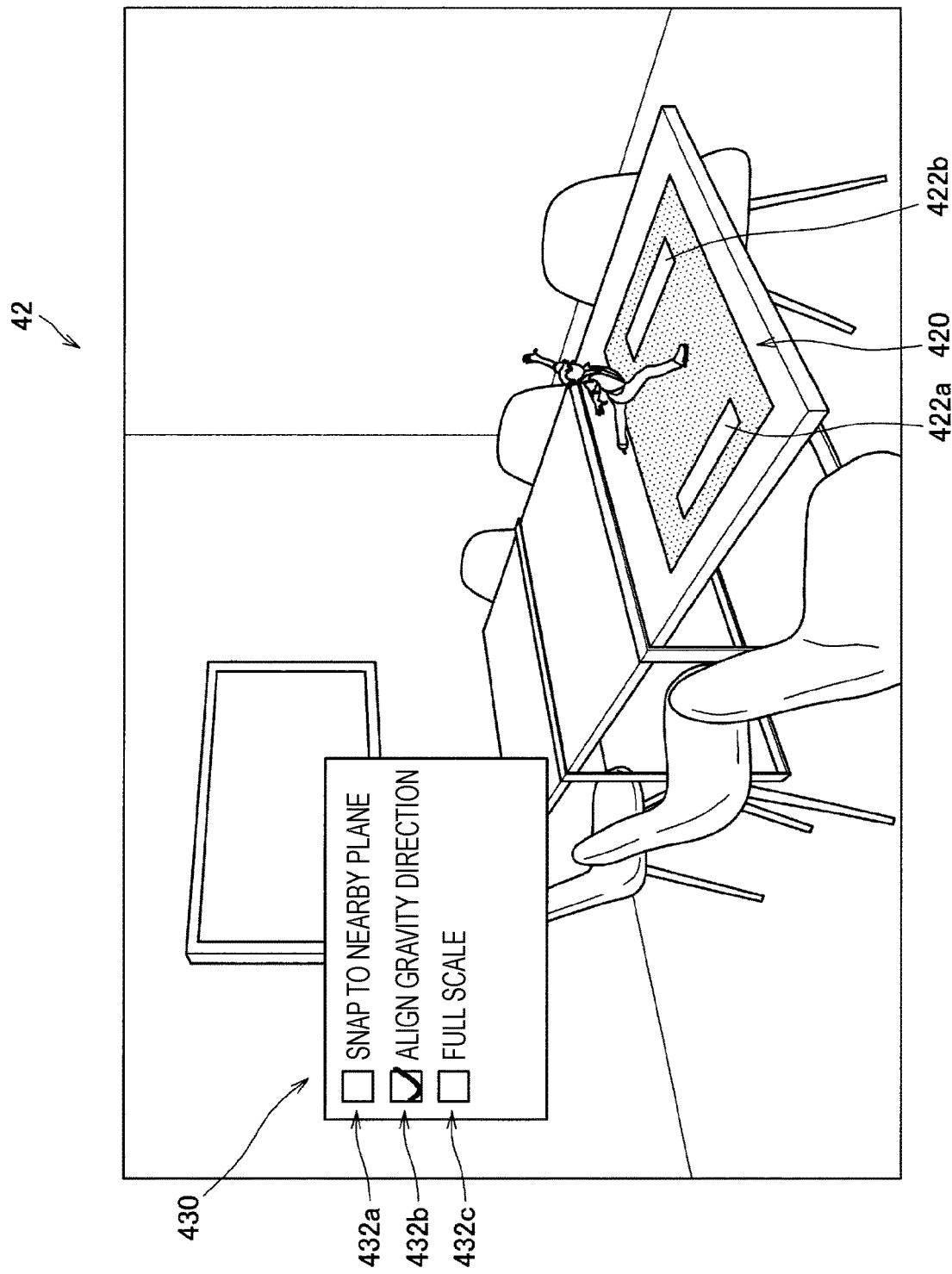
FIG. 7 is a diagram showing another display example of a GUI for designating a display region of a video to be reproduced according to the same embodiment.

FIG. 7 is an explanatory diagram showing another display example of a GUI. Note that, in the example shown in FIG. 7, an example is shown in which a menu 430 for the viewer/listener to designate the value of the specific display parameter related to the corresponding moving image is displayed on the display unit 326 together with the GUI 420 shown in FIG. 6. As shown in FIG. 7, the menu 430 includes, for example, a designation field 432*a* for designating whether or not to cause the display area of the corresponding moving image to be snapped to a nearby plane, a designation field 432*b* for designating whether or not to perform display such that the height direction of the corresponding moving image coincides with the gravity direction in the real space, and a designation field 432*c* for designating whether or not to set the display size of the corresponding moving image to full scale.

In the example shown in FIG. 7, in a case where it is detected that a predetermined sound command for snapping the display region of the corresponding moving image to the nearby plane has been issued, the determination unit 106 determines that the display region of the corresponding moving image is snapped to the nearby plane.

Note that, in a case where contact between the handle GUI 422 and the hand of the viewer/listener (as described above) is determined using the screen coordinate system of the screen displayed on the display unit 326, there are only two degrees of freedom of input. Therefore, in this case, it is desirable that causing the display region of the corresponding moving image to be snapped to the nearby plane, and making the height direction of the corresponding moving image coincide with the gravity direction of the real space are automatically set. As a result, the viewer/listener can operate the GUI 420 as intended.

(c) Inquiry to Viewer/Listener

Furthermore, the determination unit 106 can determine a plurality of candidates for the display region of the corresponding moving image (hereinafter, referred to as region candidate) on the basis of the depth map included in the acquisition request, and then, determine the display region of the moving image on the basis of the region candidate determined to be selected by the viewer/listener from among the plurality of region candidates.

Figure 8:
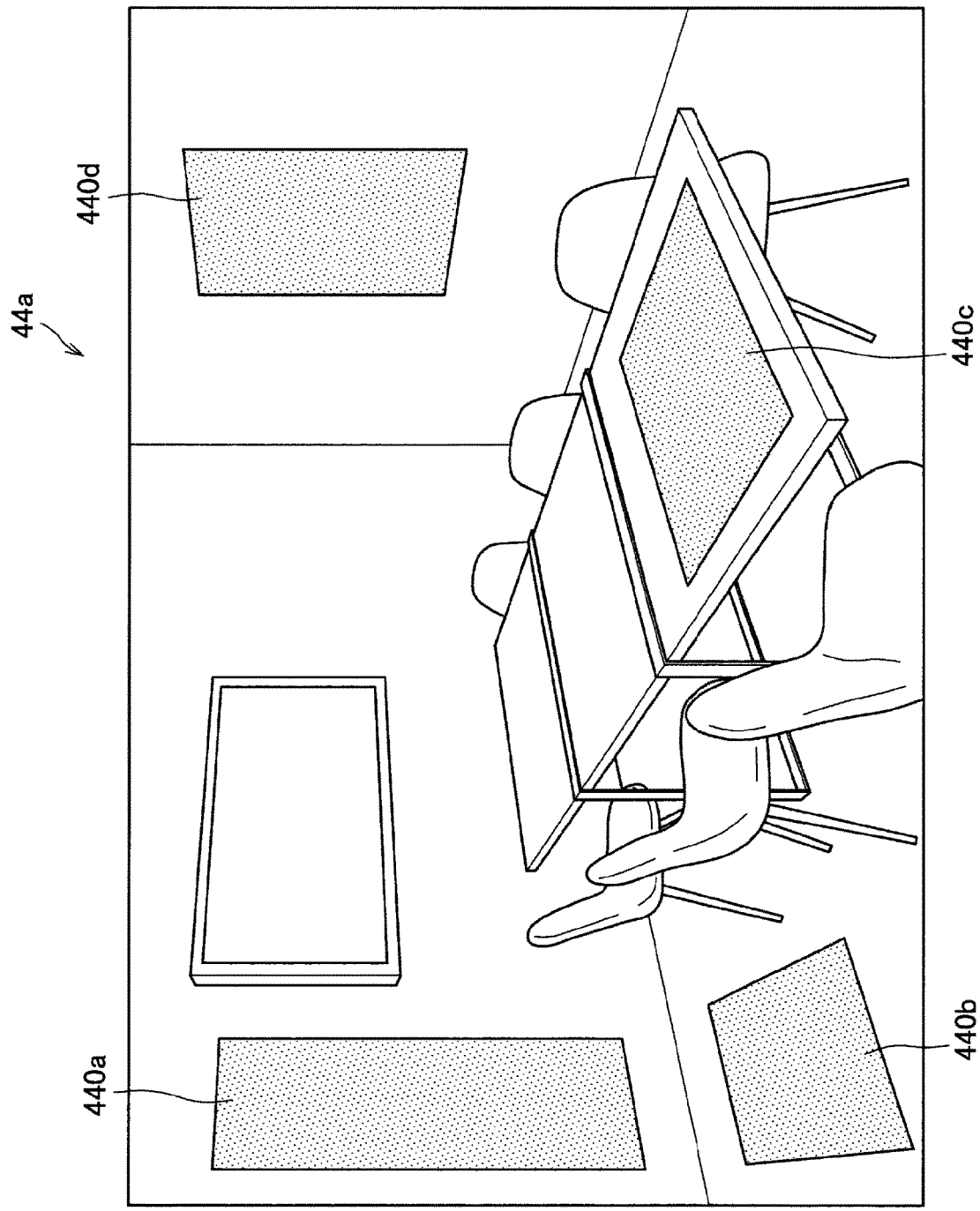
FIG. 8 is a diagram showing a display example of a candidate for a display region of a video to be reproduced according to the same embodiment.
Figure 9:
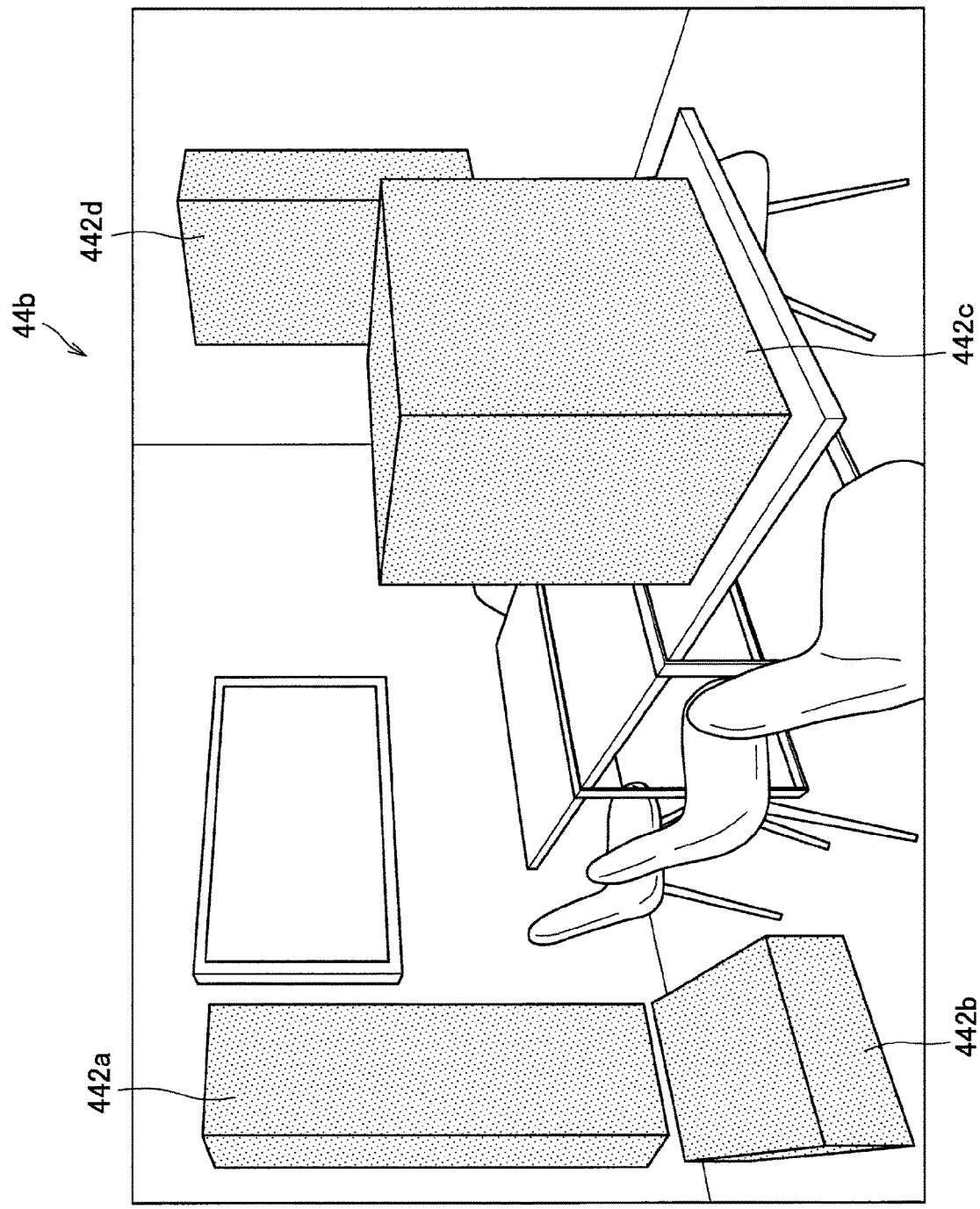
FIG. 9 is a diagram showing another display example of a candidate for a display region of a video to be reproduced according to the same embodiment.
Figure 10:
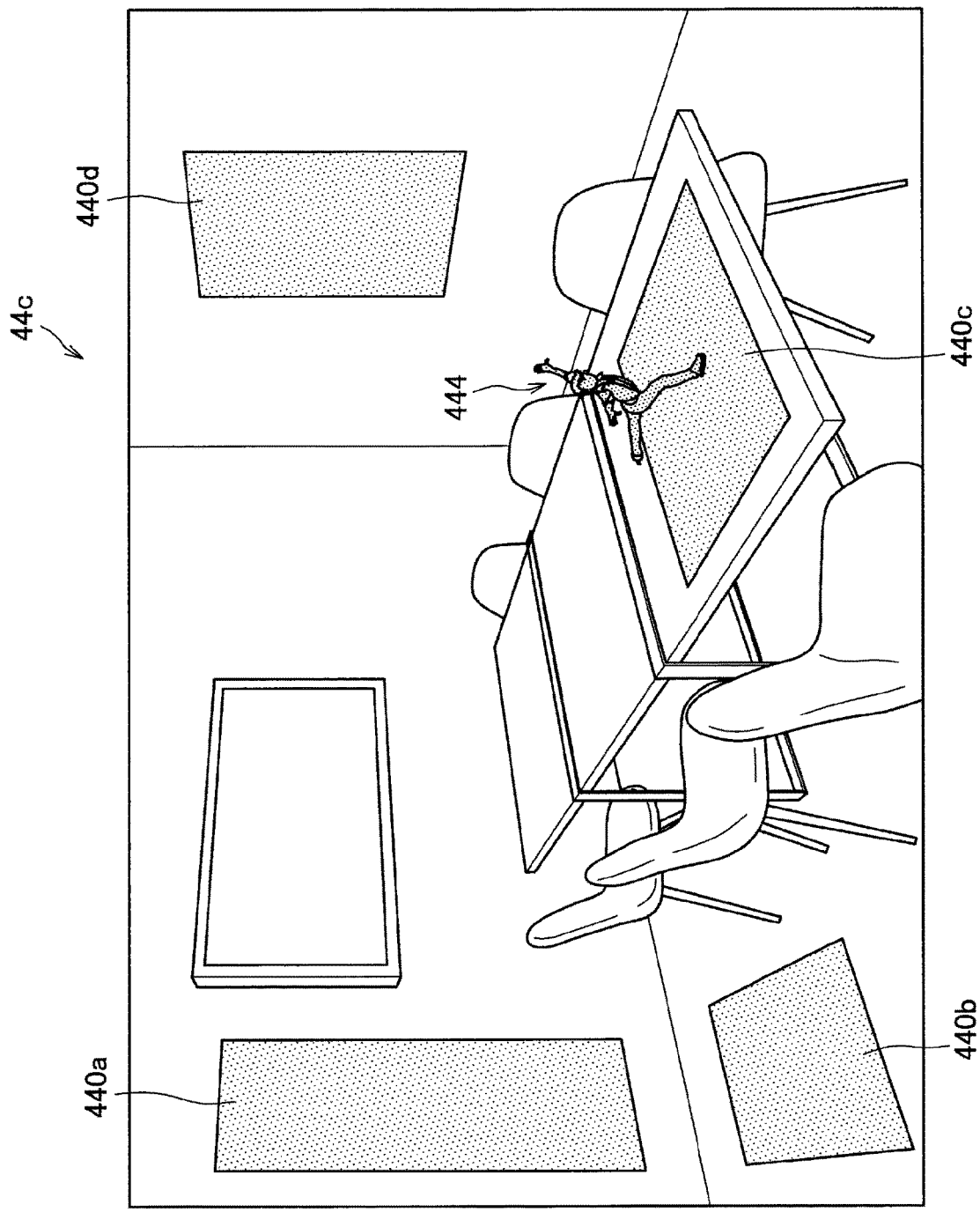
FIG. 10 is a diagram showing a display example of a preview video related to a video to be reproduced according to the same embodiment.

Here, referring to FIGS. 8 to 10, the function described above will be described in more detail. For example, the determination unit 106 first calculates a point cloud on the basis of the depth map included in the acquisition request, then, uses an algorithm such as RANSAC, for example, to calculate a plurality of closed planes on the basis of the point cloud, and sets the detected closed planes to the region candidates. Alternatively, the determination unit 106 may detect a plurality of empty spaces (three-dimensional spaces), and then, use the detected empty spaces as the region candidates.

Subsequently, the determination unit 106 extracts a plurality of region candidates from all the detected region candidates on the basis of a predetermined index (for example, size, shape, position, distance from the user, or the like of the region candidates). Then, the display control unit 108 as described later causes the extracted plurality of region candidates 440a-440d (or the region candidates 442a-442d) to be displayed on (the display unit 326 of) the reproduction device 30 as shown in an environment 44a of FIG. 8 or an environment 44b of FIG. 9, for example.

Subsequently, the determination unit 106 specifies any from among the plurality of region candidates on the basis of the detection result of the user's line-of-sight direction or the face direction with respect to the display unit 326, the detection result of a gesture (for example, finger pointing, or the like), or a detection result of a fact that a predetermined sound command (for example, "set to on the desk!", "set to right side region!", or the like) has been issued. Then, the display control unit 108 as described later emphasizes and displays the specified region candidate on the reproduction device 30. For example, as shown in an environment 44c of FIG. 10, the display control unit 108 may cause the reproduction device 30 to display a preview video 444 of the corresponding moving image received from the server 10, in the corresponding region candidate (region candidate 440c in FIG. 10). Here, as shown in FIG. 10, the preview video 444 is a video displayed in a display mode different from the video at the time of normal reproduction (for example, it is displayed in gray scale, displayed with higher transparency, or the like). As a result, the user can understand that the displayed video is a preview video.

Thereafter, in a case where a predetermined gesture for determining the display region is detected, or issue of a predetermined sound command (for example, "there!", or the like) for determining the display region is detected, the determination unit 106 determines the corresponding region candidate as the display region of the moving image.

(d) Determination of Plurality of Display Regions

Furthermore, in a case where a plurality of moving images are reproduced at the same time (for example, on the basis of user designation or the like), the determination unit 106 can determine each display region of the plurality of moving images such that the plurality of moving images are aligned in a predetermined positional relationship. For example, the determination unit 106 determines the display region of the plurality of moving images such that the center positions of a plurality of moving images to be reproduced are arranged at regular intervals, on the basis of the detection result of the operation on the GUI displayed on the display unit 326, the detection result of the sound command, or the like. Alternatively, the determination unit 106 may determine the display region of the plurality of moving images such that the center positions of the plurality of moving images coincide with each other, or a specific shaft direction coincides with the center positions of the plurality of moving images. Alternatively, the determination unit 106 determines the display region of the plurality of moving images such that the vertical directions (gravity directions) of the plurality of moving images coincide with each other.

Here, the center position may be an origin preset for each moving image stored in the moving image DB 124. Alternatively, in a case where the origin is not set in advance, the center position may be each origin when the point clouds corresponding to the plurality of moving images to be reproduced are aligned so as to overlap with each other. Alternatively, the center position may be set to a position corresponding to a predetermined pattern or a predetermined shape (for example, a predetermined signboard, mark, or the like).

For example, in a case where a plurality of moving images to be reproduced are moving images of the same stadium, the offset amount of the position and posture corresponding to each of the plurality of moving images may be obtained in advance such that the display positions of the tracks in each moving image coincide at the time of display of the plurality of moving images.

Note that in a case where a plurality of moving images are reproduced at the same time, a plurality of moving images can be displayed overlapping with each other, so that it is assumed that the moving images are hard to see. Therefore, the display control unit 108 as described later may change the display mode such that the visibility is reduced for the moving image determined as the image not attracting viewer/listener's attention, on the basis of, for example, the detection result of the viewer/listener's line-of-sight direction, or the like. For example, the display control unit 108 may display the corresponding moving image translucently or change the display color of the corresponding moving image to another color for display.

2-2-4-3. Determination of Display Portion in Moving Image

Furthermore, the determination unit 106 can determine that only a part of the moving image to be reproduced is displayed on the reproduction device 30 on the basis of predetermined criteria. For example, the determination unit 106 may determine that only the region of the foreground portion in the moving image to be reproduced determined on the basis of the predetermined criteria is displayed on the reproduction device 30.

(a) User Designation

Instructions for Virtual Object

Figure 11:
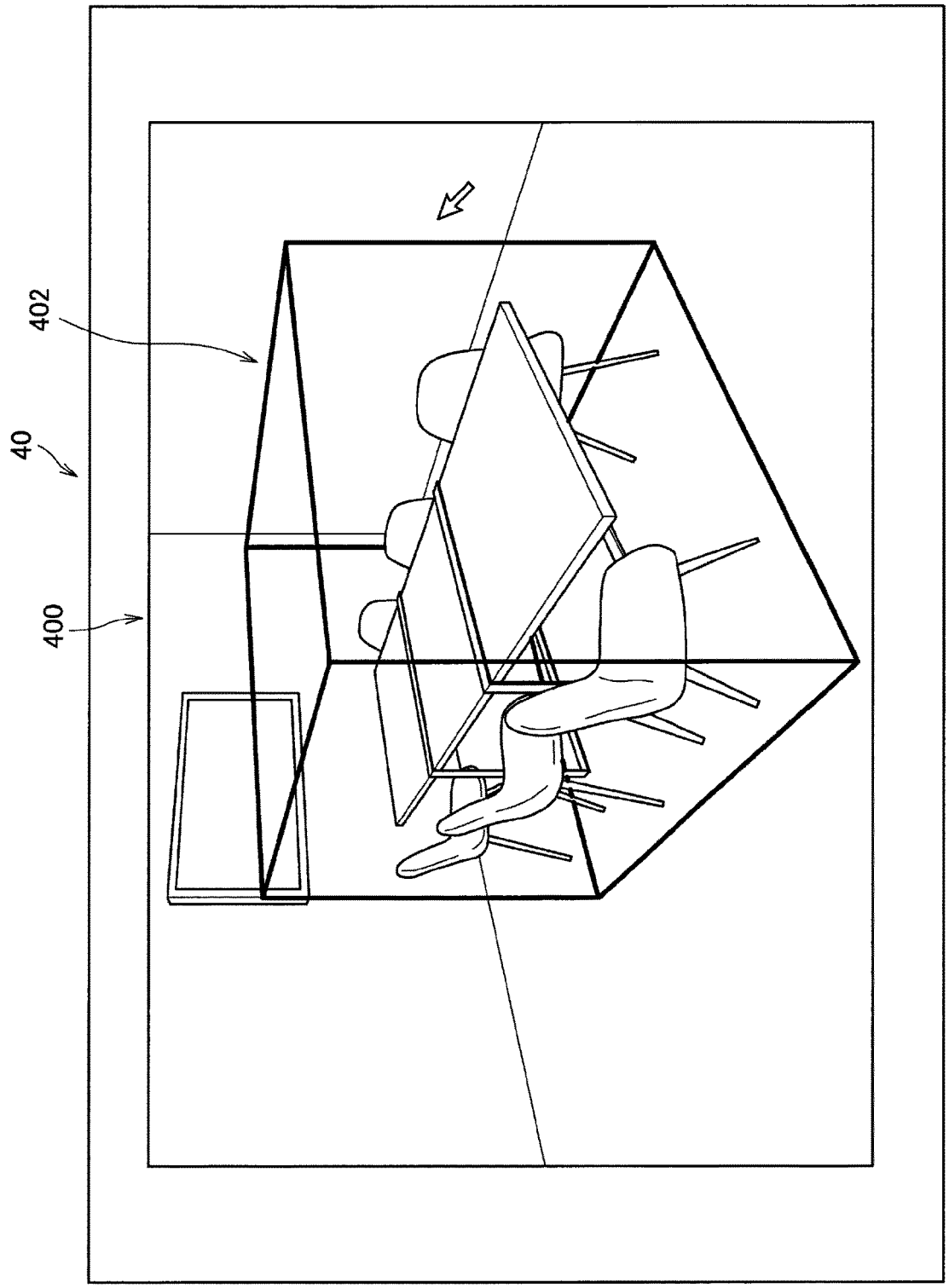
FIG. 11 is a diagram showing a designation example of a foreground portion by a user on an operation screen for designating the foreground portion according to the same embodiment.

Here, the space corresponding to the foreground portion may be preset for each moving image by the photographer of the moving image. For example, the space corresponding to the foreground portion may be set on the basis of the instruction of the photographer (or the poster of the moving image) with respect to the virtual object. As one example, a space corresponding to the foreground portion may be set on the basis of the input of the photographer with respect to the predetermined operation screen. Here, on the operation screen, a video based on the depth map sensed by the recording device 20 may be displayed. For example, as shown in an environment 40 of FIG. 11, in a case where a predetermined object 402 (for example, a cube, a sphere, a mesh, or the like) is arranged by the user in the video displayed on the operation screen 400, the space corresponding to the object may be set as the foreground. Furthermore, in a case where a plurality of objects are arranged by the user, a space corresponding to the synthesis (for example, sum, product, or the like) of the plurality of objects can be set as the foreground portion. Note that the foreground portion may be separately set for each reproduction time of the moving image.

Designation in Real Space

Alternatively, the space corresponding to the foreground portion may be set on the basis of the detection result of the path the photographer has moved in the real space. For example, first, a path the photographer has moved in the real space is sensed, and then, a closed plane (closed region) corresponding to the path can be specified. Then, the space corresponding to the specified closed plane, the gravity direction, the set value of the height (for example, the height from the floor to the ceiling, the preset upper limit value and lower limit value, or the like) may be set as the space corresponding to the foreground portion. Note that, in this case, the display indicating the set space range may be displayed by the display unit (not shown) in the real space where the photographer is located. Here, the display unit may be an HMD worn by a photographer, or may be a projector or the like. Note that the recording device 20 may include the display unit.

Furthermore, in a case where a predetermined gesture for changing the foreground portion (for example, moving palm forward, or the like) is detected, the set foreground portion may be changed on the basis of the detection result. For example, in a case where a gesture of moving palm forward is detected, the space corresponding to the foreground portion may be changed to a space corresponding to synthesis (sum, product, or the like) of the space corresponding to the set foreground portion, and the space corresponding to the gesture (for example, a plane obtained by expanding the palm of the hand, a space corresponding to a sphere centering around the palm of the hand, or the like). Note that, at this time, a display indicating the range of the space corresponding to the gesture (or the space corresponding to the foreground portion after the change) may be further displayed on the display unit described above.

(b) Object Recognition Result

Alternatively, the space corresponding to the foreground portion may be set for each moving image according to result of the object recognition based on the moving image or the depth map associated with the moving image.

For example, the control unit 100 of the server 10 first performs object recognition on the basis of the color information of the moving image, the feature points detected from the moving image, and/or the depth map associated with the moving image, and then, sets the space corresponding to the recognized object as a space corresponding to the foreground portion. Here, the range of the space corresponding to the object may be designated by the user, or may be determined according to the recognized object. For example, in a case where a person's face is recognized, the control unit 100 sets a space corresponding to the foreground portion on the basis of the range of space (for example, a range within 1 m to the front, rear, left, and right with the face as the center, within 1 m upward, within 2 m downward, or the like) set in advance in association with the face. Furthermore, in a case where the whole body of the person is recognized, the control unit 100 sets the whole body as a space corresponding to the foreground portion. Furthermore, in a case where a predetermined marker is recognized, the control unit 100 sets, for example, a space within a radius of 5 m from the marker as a space corresponding to the foreground portion. Furthermore, in a case where a sheet of a predetermined color or pattern is recognized, the sheet, the one-way direction in which the sheet faces (for example, the upward direction of the sheet, or the like), and the space determined by the predetermined distance are set as the space corresponding to the foreground portion.

Note that, at the time of transmission of the moving image and the depth map to the reproduction device 30, it is possible that the control unit 100 performs masking processing on the regions other than the foreground portion (set) with respect to each of the moving image and the depth map, and then, does not perform encoding and does not transmit for the masked region. As a result, the communication band can be saved. Furthermore, as a modification, the display control unit 108 of the server 10 may cause the communication unit 120 to transmit data indicating a target region of the mask (hereinafter referred to as mask data) to the reproduction device 30 together with the moving image and the depth map. In this case, it is possible that the display control unit 310 of the reproduction device 30 first performs processing of cutting out the region indicated by the received mask data for each of the received moving image and depth map, and then, causes the display unit 326 to display a video corresponding to the processed moving image and depth map.

(c) Detection Result of Time Series Change of Three Dimensional information.

Alternatively, the space corresponding to the foreground portion may be set for each moving image according to result of the object motion recognition based on the moving image or the depth map associated with the moving image. For example, a motion vector may be recognized on the basis of a point cloud generated from the depth map, and a space corresponding to the recognized motion vector may be set as a space corresponding to the foreground portion.

As an example, the control unit 100 of the server 10 first specifies a point cloud on the basis of a depth map associated with each moving image with respect to a plurality of moving images (for example, pieces of position information of each other at the time of recording are close), and point clouds are superimposed on a predetermined voxel. Subsequently, in the predetermined voxel, the control unit 100 specifies the element of the voxel that continues to exist at a probability equal to or larger than the predetermined value (continuously for a predetermined time) (that the element in which the object located within the element is estimated to be stationary), and sets the space corresponding to the specified element as the space corresponding to the background portion. Note that, at this time, the control unit 100 can also set the space corresponding to the background portion by using the setting method of the space corresponding to the foreground portion based on the object recognition result as described above. For example, in a case where the space corresponding to the element includes a space (hereinafter referred to as a space A) corresponding to the foreground portion, which is specified on the basis of the recognized object and the above-described setting method, the control unit 100 may set the space excluding the space A from the space corresponding to the element as the space corresponding to the background portion.

Subsequently, the control unit 100 sets a space other than the space corresponding to the background portion as a space corresponding to the foreground portion. Note that, at the time of transmission of the moving image and the depth map to the reproduction device 30, it is possible that the control unit 100 performs masking processing on the regions of the background portion (set) with respect to each of the moving image and the depth map, and does not transmit for the masked region. Alternatively, (as described above) the display control unit 108 may cause the communication unit 120 to transmit the mask data indicating the target region of the mask together with the moving image and the depth map to the reproduction device 30.

(d) Comparison Result between Three-Dimensional Information at the Time of Photographing and Three-Dimensional Information at the Time of Reproduction Alternatively, the space corresponding to the foreground portion may be set on the basis of a result of comparison between three-dimensional information at the time of photographing of a moving image to be reproduced and three-dimensional information at the time of reproducing of the moving image.

For example, first, the control unit 100 of the server 10 calculates the transformation matrix for superimposing the point cloud specified on the basis of the depth map included in the acquisition request of the moving image received from the reproduction device 30, and a point cloud specified on the basis of the depth map associated with the moving image to be reproduced, using an algorithm such as the feature point base or the iterative closest point (ICP), for example. Subsequently, the control unit 100 generates background voxels from each of the two point clouds. Then, the control unit 100 sets the product of the generated two background voxels as the (final) background voxel. Then, the control unit 100, for example, sets a space other than the space included in the background voxel as a space corresponding to the foreground portion.

Note that, at the time of transmission of the moving image and the depth map to the reproduction device 30, it is possible that the control unit 100 performs masking processing on the regions excluding the foreground portion (set) with respect to each of the moving image and the depth map, and does not transmit for the masked region. Alternatively, (as described above) the display control unit 108 may cause the communication unit 120 to transmit the mask data indicating the target region of the mask together with the moving image and the depth map to the reproduction device 30.

2-2-4-4. Color Conversion

Adjustment of Color Temperature

Note that in a case where the illumination condition or the like is greatly different between photographing and reproduction (for example, in a case where the image photographed at night is reproduced in the day, or the like), if the moving image to be reproduced as displayed as at as in the environment at the time of reproduction, the color tone is greatly different so that the viewer/listener can perceive the moving image unnaturally. Therefore, the determination unit 106 may perform processing of masking the background portion of the moving image to be reproduced, or perform color conversion on the moving image to be reproduced on the basis of the image photographed by the camera of the reproduction device 30.

Figure 12:
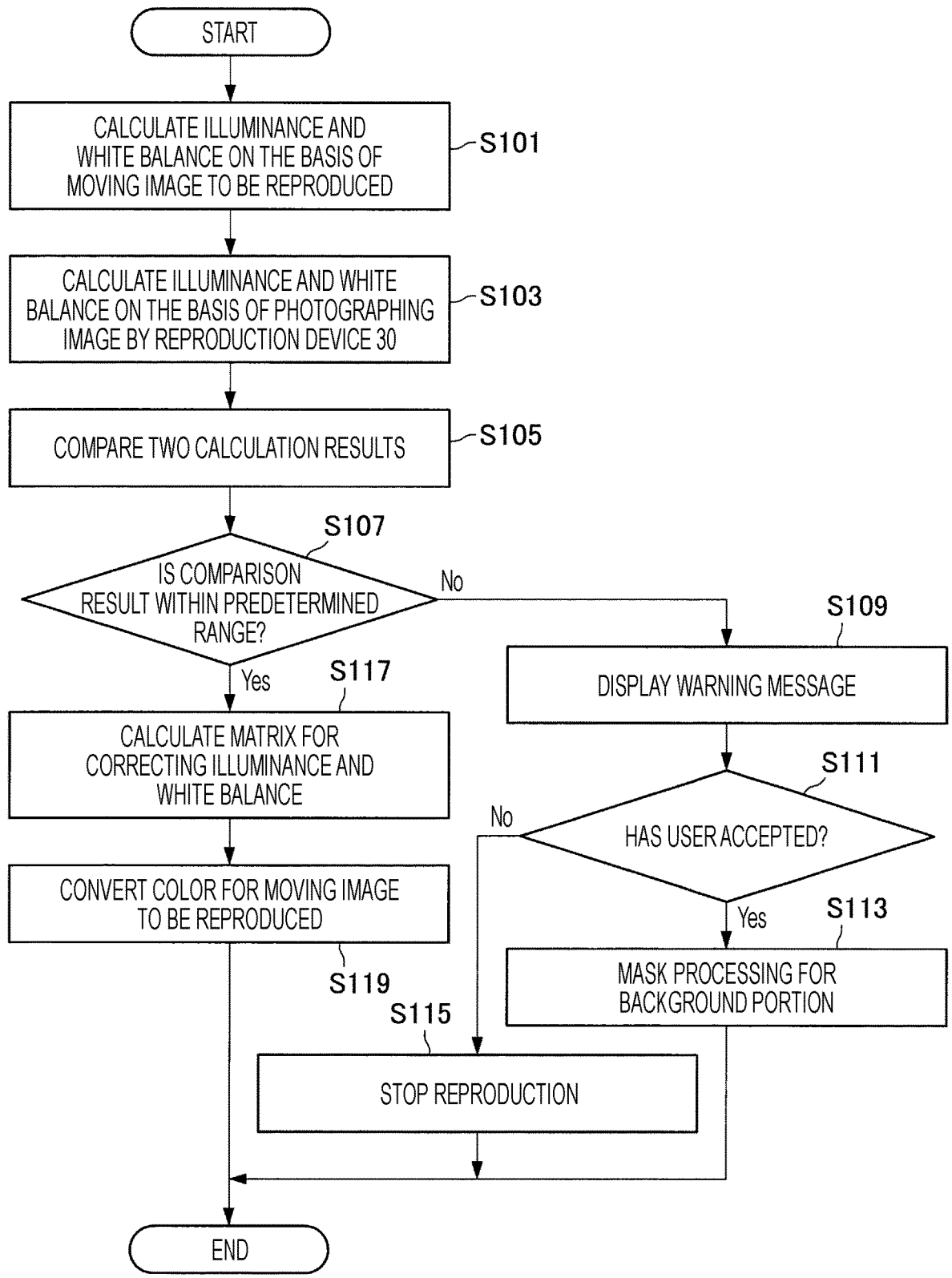
FIG. 12 is a flowchart showing a flow of color conversion processing for a moving image to be reproduced according to the same embodiment.

Here, referring to FIG. 12, the flow of the processing described above will be described. As shown in FIG. 12, for example, first, the control unit 100 of the server 10 calculates the illuminance and the white balance on the basis of the moving image to be reproduced (S101). Next, the control unit 100 calculates illuminance and white balance on the basis of the image photographed by the reproduction device 30 (S103). Then, the control unit 100 compares them (S105).

In a case where the comparison result exceeds the predetermined range (S107: No), the control unit 100 causes (the display unit 326 of) the reproduction device 30 to display the warning message (S109). Thereafter, in a case where acceptance of display is input (S111: Yes), the control unit 100 performs processing of masking the background portion of the moving image to be reproduced and the depth map associated with the moving image (S113). Then, (the display unit 326 of) the reproduction device 30 displays the video corresponding to the moving image after masking and the depth map after masking. Thereafter, the process ends.

On the other hand, in a case where non-acceptance of display is input (S111: No), the control unit 100 determines to stop displaying the moving image to he reproduced (S115). Note that, as a modification, instead of S109 to S115, the control unit 100 of the server 10 may newly select another moving image as the moving image to be reproduced, and causes (the display unit 326 of) the reproduction device 30 to perform display so as to recommend the reproduction of the selected moving image to the viewer/listener.

On the other hand, in a case where the comparison result is within the predetermined range (S107: Yes), the control unit 100 performs color conversion on the moving image to be reproduced on the basis of the image photographed by the camera of the reproduction device 30. More specifically, first, the control unit 100 calculates the difference between the illuminance calculated on the basis of the moving image to be reproduced and the illuminance calculated on the basis of the image photographed by the reproduction device 30, to calculate a matrix A for correcting the moving image to be reproduced. Subsequently, the control unit 100 calculates the difference between the white balance calculated on the basis of the moving image to be reproduced and the white balance calculated on the basis of the image photographed by the reproduction device 30, to calculate a matrix B for correcting the moving image to be reproduced (S117).

Subsequently, the control unit 100 calculates an eigenvalue of the product of the matrix A and the inverse matrix of the matrix B. Then, in a case where the eigenvalue is within the predetermined range, the control unit 100 multiplies the product of the matrix A and the inverse matrix of the matrix B for each pixel included in the moving image to be reproduced, thereby correcting the illuminance and the white balance (S119)). Note that in a case where the eigenvalue exceeds the predetermined range, the control unit 100 may determine that the correction is impossible, and perform processing of masking the background portion of the moving image to be reproduced.

Adjustment of Resolution

Furthermore, in a case where the reproduction device 30 is a non-transmissive HMD, in a case where the resolution of the image photographed by the camera of the reproduction device 30 is different from the resolution of the corresponding moving image, the determination unit 106 can perform processing of lowering one resolution to another resolution that is lower.

2-2-4-5. Charge State

Change of Display Mode of Video

Furthermore, the determination unit 106 can further determine the display size of the corresponding moving image on the basis of the data indicating the viewer/listener's charge state or the data indicating the viewer/listener's authority. Here, the data indicating the viewer/listener's charge state or the data indicating the viewer/listener's authority may be stored in the user DB 126. Here, the user DB 126 is a database that stores information associated with each user (photographer, viewer/listener, or the like).

For example, the determination unit 106 increases the range of the displayed space among the moving images as the amount paid by the viewer/listener is larger. As an example, in a case where the paid amount is "0 yen" (in a case of free), the determination unit 106 sets the range of the corresponding space to "1.0 m×1.0 m×1.0 m". Furthermore, in a case where the paid amount is "100 yen", the determination unit 106 sets the range of the corresponding space to "1.5 m×1.5 m×1.5 m". Furthermore, in a case where the paid amount is "200 yen", the determination unit 106 sets the range of the corresponding space to "2.0 m×2.0 m×2.0 m". Furthermore, in a case where the paid amount is more than "200 yen", the determination unit 106 sets the range of the corresponding space to all photographed space. Alternatively, the determination unit 106 may change the range of the height and the depth of the displayed space in the corresponding moving image according to the amount paid by the viewer/listener.

Alternatively, in a case where the paid amount is "0 yen" (in a case of free), the determination unit 106 transmits only the video to the reproduction device 30 and determines not to transmit the depth map to the reproduction device 20. That is, the two-dimensional video is displayed on (the display unit 326 of) the reproduction device 30. Furthermore, in a case where the paid amount is more than "0 yen" and equal to or less than the predetermined amount, the determination unit 106 determines the display size of the corresponding moving image as "reduced size". Furthermore, in a case where the paid amount is more than the predetermined amount, the determination unit 106 determines the display size of the corresponding moving image to full scale.

Alternatively, in a case where the paid amount is "0 yen" and the full scale is designated by the viewer/listener as the display size of the moving image to be reproduced, the determination unit 106 may determine that the predetermined advertisement object is automatically superimposed and displayed in the corresponding moving image.

Alternatively, the determination unit 106 may change the compression rate of the corresponding moving image and/or the depth map associated with the corresponding moving image according to the amount paid by the viewer/listener.

For example, in a case where the paid amount is "0 yen" (in a case of free), the determination unit 106 (may not change the depth map) may reduce part of color information, such as lowering the resolution of the corresponding moving image, for example. Alternatively, in this case, the determination unit 106 may reduce part of the data amount (resolution or the like) of the depth map so that the shape of each object is coarse, for example.

Processing Availability for Video

Furthermore, the determination unit 106 can set availability of processing by the viewer/listener for the corresponding moving image according to the amount paid by the viewer/listener. For example, in a case where the paid amount is equal to or more than the predetermined amount, the determination unit 106 may perform setting such that the viewer/listener can add a predetermined virtual object (for example, novelty of advertisement, or the like) to the corresponding moving image. Note that, after the virtual object is added, even in a case where the corresponding moving image is reproduced by another viewer/listener, the corresponding moving image can be reproduced with the virtual object added.

Furthermore, in a case where the paid amount is equal to or more than the predetermined amount, the determination unit 106 may perform setting such that the viewer/listener can add the sensed three-dimensional information (for example, point cloud, or the like) to the corresponding moving image. Here, the three-dimensional information may be three-dimensional information (point cloud or the like) corresponding to the sensing result by the reproduction device 30 or another three-dimensional sensor (depth sensor or the like) arranged around the viewer/fastener. For example, the three-dimensional information may be three-dimensional information of a space including the whole or a part of the viewer/listener's body.

Furthermore, in a case where the paid amount is equal to or more than the predetermined amount, the determination unit 106 may make it possible for the viewer/listener to add a predetermined virtual object to the corresponding moving image, and also make the position and posture of the corresponding virtual object to be changeable according to the sensing result by the portable device used by the viewer/listener (for example, the sensing result of the position information and posture information of the portable device, or the like). Note that the virtual object may be, for example, a "chemical light" type object, or the like. According to these control examples, the viewer/listener can freely reflect the viewer/listener itself, the motion of the portable device, or the like on the corresponding moving image, and then, can share the reflected information with other viewer/listeners.

2-2-4-6. Display Mode

Furthermore, the determination unit 106 can determine the display mode of the corresponding moving image on the basis of predetermined criteria. For example, two types of display modes, a space fixed mode and a moving body fixed mode may be prepared in advance. In this case, the determination unit 106 may determine any of the two types of display modes as the display mode on the basis of the designation by the user. Alternatively, the determination unit 106 may automatically determine any of the two types of display modes as a display mode on the basis of the determined display region (for example, the size of the display region, or the like).

Figure 13:
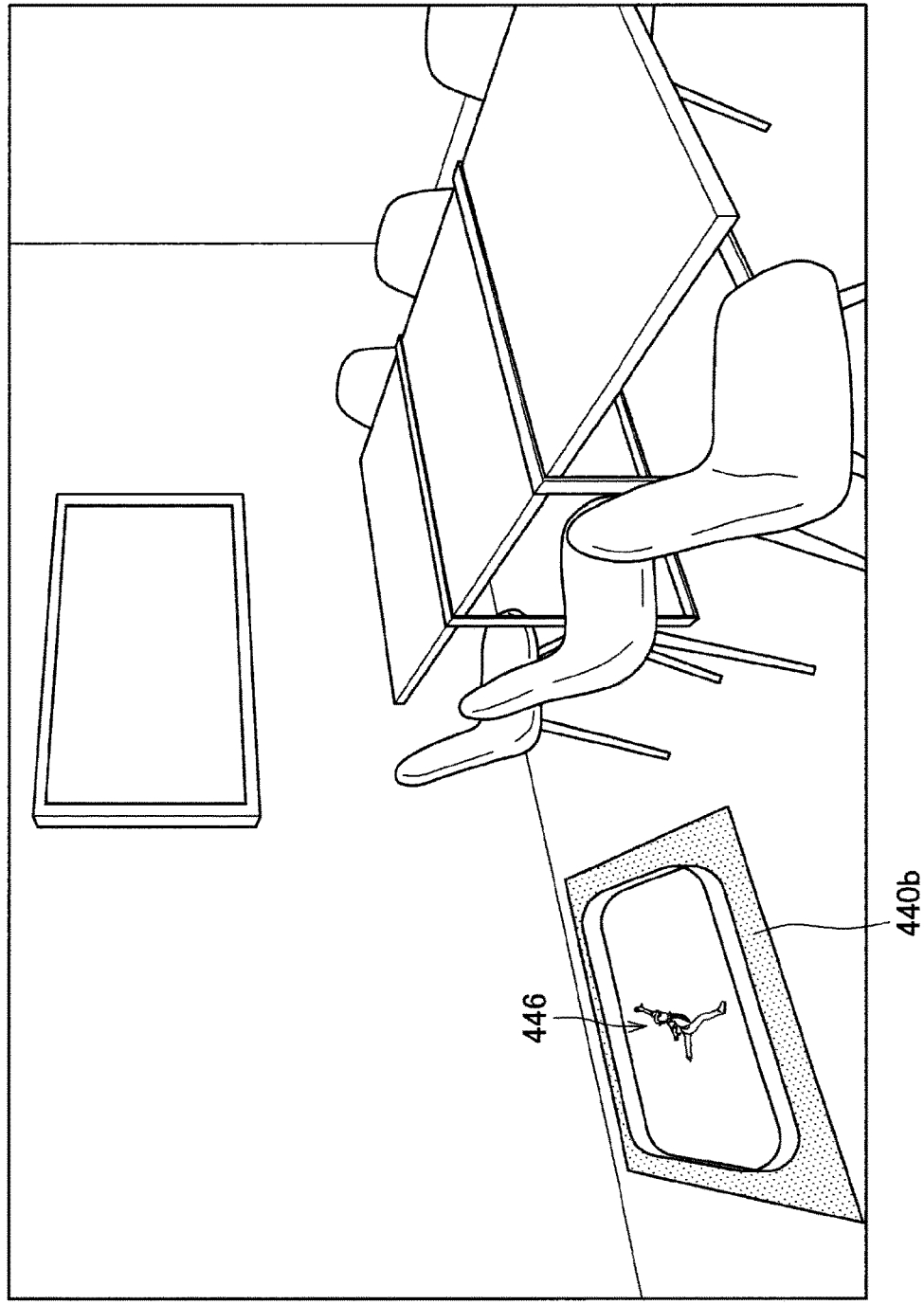
FIG. 13 is a diagram showing a display example of a video when a spatial fixed mode is set according to the same embodiment.

Here, the space fixed mode is a mode in which the entire photographed space is continuously displayed. FIG. 13 is an explanatory view showing a display example of a video at the time of setting of the space fixed mode. In the example shown in an environment 44e of FIG. 13, in the determined display region 440b, the video 446 corresponding to the moving image of the entire skate link is continuously displayed.

Furthermore, the moving body fixed mode is a mode in which a specific moving object (for example, a person, a face, a vehicle, a robot, or the like) within the photographed space is continuously displayed. For example, in the moving body fixed mode, the moving object designated by the user is tracked in the moving image to be reproduced, so that the moving body can be continuously displayed in the determined display region. As an example, constraints such as the maximum value and the minimum value may be set with respect to the value in each axis direction and the range of the rotation angle. Then, in a frame in which it is specified that the limitation is exceeded, on the basis of the information set in advance for the user, a region of a part of the frame may be clipped, the motion of the moving body may be repeated, or the position of the moving body may be folded back and displayed.

Figure 14:
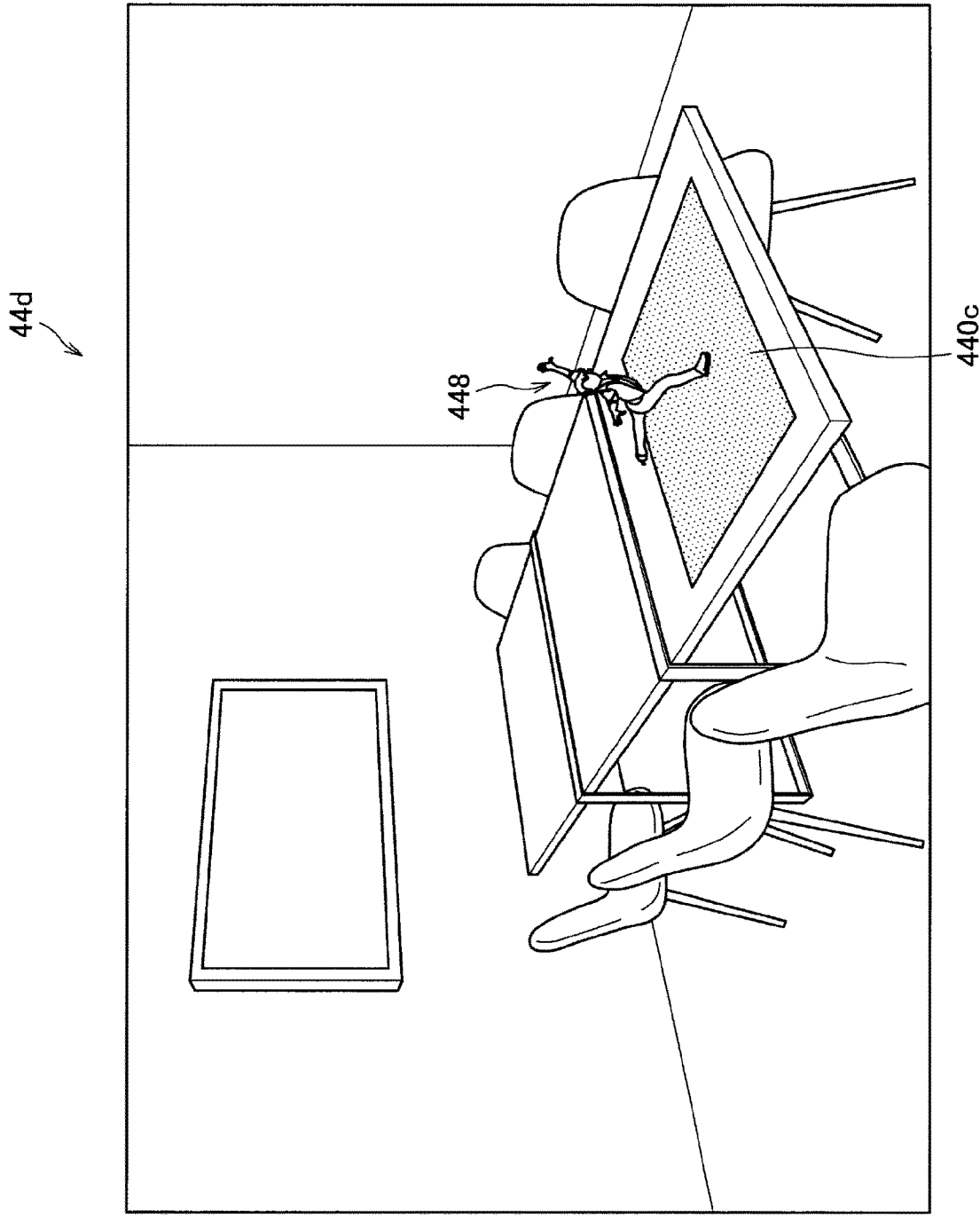
FIG. 14 is a diagram showing a display example of a video when a moving body fixed mode is set according to the same embodiment.

FIG. 14 is an explanatory diagram showing a display example of a video at the time of setting of the moving body fixed mode. In the example shown in an environment 44d of FIG. 14, for example, a skate player in a moving image in which a skate link (whole or a part) is photographed is set as a moving object, and the video 448 including the image region of the skate player in the moving image is continuously displayed in the determined display region 440c.

2-2-4-7. Reproduction Start Timing

Furthermore, the determination unit 106 can also determine the reproduction start timing when the display of the moving image to be reproduced by the reproduction device 30 is started, on the basis of the predetermined criteria. For example, the determination unit 106 determines the reproduction start timing on the basis of a sensing result (for example, a photographed image, or the like) by the reproduction device 30. As an example, in a case where the corresponding moving image includes a video of an origami lecture, and the image in which the viewer/listener's hand is moved forward is photographed by the camera of the reproduction device 30, the display control unit 108 may determine the start timing of the lecture in the moving image as the reproduction start timing.

2-2-5. Display Control Unit 108

2-2-5-1. Display of Moving Image Site

The display control unit 108 controls display of various types of information with respect to the reproduction device 30. For example, the display control unit 108 can cause the reproduction device 30 to display a screen showing a list of moving images corresponding to the acquisition request on the basis of the acquisition request of the moving image received from the reproduction device 30. As an example, the display control unit 108 performs a search in the moving image DB 124 using position information, keywords, or the like included in the received acquisition request as a search key, and then, causes the reproduction device 30 to display a screen showing a list of searched moving images (for example, a title, thumbnail, position information at the time of recording, or the like of each moving image).

2-5-2. Video Reproduction

Furthermore, the display control unit 108 causes the reproduction device 30 to display the video corresponding to the moving image to be reproduced and the depth map associated with the moving image on the basis of the setting related to display of the video determined by the determination unit 106. For example, the display control unit 108 first generates control information for displaying the video in the display region of the video determined by the determination unit 106 and with the determined display size. Then, the display control unit 108 causes the communication unit 120 to transmit the moving image to be reproduced, the depth map associated with the moving image, and the control information to reproduction device 30.

2-2-5-3. Adjustment of Reproduction Speed and Scale

Furthermore, the display control unit 108 can change the reproduction speed and the reproduction position of the corresponding video on the basis of the data indicating the situation at the time of reproduction. For example, in a case where a hand image is included in the corresponding moving image, the display control unit 108 may change the scale of the corresponding video (display magnification) such that the size of the hand of the viewer/listener recognized on the basis of the image photographed by the camera of the reproduction device 30 and the size the image of the hand in the moving image match. As a result, the viewer/listener can more easily understand the motion of the hand in the corresponding video.

Moreover, the display control unit 108 may sequentially change the reproduction speed of the video such that the recognition result of the hand motion of the viewer/listener, and the hand motion in the corresponding video match as much as possible, on the basis of a comparison between the bone of the hand recognized from the image or the hand and the bone of the hand of the viewer/listener recognized on the basis of the photographed image by the reproduction device 30. As a result, for example, at the time of the reproduction of the moving image in which a scene Where a series of work is performed using a hand, every time the viewer/listener performs one piece of work, the video indicating the contents of the next work in the series of work may be sequentially displayed.

Furthermore, for example, in a case where the corresponding video includes a video in which the user operates on a predetermined object such as origami, the display control unit 108 may change the scale of the corresponding video such that the object located at the hand of the viewer/listener (for example, the object held in the hand, or the like) recognized on the basis of the image photographed by the camera of the reproduction device 30 and the predetermined object in the corresponding video are of the same size. As a result, the viewer/listener can more easily understand the situation of the operation on the predetermined object.

2-2-5-4. Guide Display

Note that, as a modification, for example, in a case where the position and posture of the reproduction device 30 largely deviate from the position and posture of the recording device 20 at the time of photographing of the moving image to be reproduced, for example, the display control unit 108 can superimpose on the video, a guide display (for example, an icon of an arrow or the like) or a warning indicating the position or direction in which the video looks more appropriately, and causes the reproduction device 30 to display the superimposed video. Here, the guide display may be a display for guiding the viewer/listener so that the position and the posture of the reproduction device 30 are brought close to the position and the posture of the recording device 20 at the time of photographing of the moving image.

2-2-5-5. Display of Advertisement and Comment

Furthermore, the display control unit 108 can cause a virtual object such as an advertisement, a comment, a caption, or the like, for example, to be superimposed on the corresponding video and to be displayed on the reproduction device 30. For example, an advertisement may be registered in advance in a predetermined database (not shown) in association with a surface (wall, road, or the like) in the real space, in the air, a predetermined marker set in the real space, or the like. In this case, for example, the display control unit 108 may extract an advertisement corresponding to the position information and the posture information received from the reproduction device 30 from the database, then, superimpose the extracted advertisement on the corresponding video, and cause (the display unit 326 of) the reproduction device 30 to display the superimposed video. Moreover, (the control unit 100 of) the server 10 can determine that the advertisement associated with the space corresponding to the detection result of the direction the viewer/listener faces or the viewer/listener's line-of-sight direction is viewed to calculate the hit rate, hit count, or the like of each advertisement. As a result, the advertising company can pay the advertisement fee corresponding to the calculated hit rate or hit count to the photographer or poster of the corresponding moving image.

Note that, as a modified example, in a case where any advertisement displayed on the display unit 326 of the reproduction device 30 is selected by the user on the basis of, for example, a hand gesture, a sound command, or the like, the display control unit 108 may cause the reproduction device 30 to display the WEB page of the WEB site (for example, the EC site, or the like). As a result, the viewer/listener can purchase goods and services related to the advertisement.

Furthermore, the comment posted (spoken) by the viewer/listener may be associated with position information of the viewer/listener at the time of the posting or the space (or object) ahead of the viewer/listener's line of sight at the time of the posting and registered in a predetermined database (not shown). In this case, for example, for example, the display control unit 108 may specify the comment associated with the direction the viewer/listener faces or the viewer/listener's line-of-sight direction, then, superimpose the specified comment on the corresponding video, and cause the reproduction device 30 to display the superimposed video.

2-2-6. Communication Unit 120

The communication unit 120 may include, for example, a communication device 162 as described later. The communication unit 120 transmits and receives information with other devices. For example, the communication unit 120 receives the moving image, the depth map, and the meta information from the recording device 20. Furthermore, the communication unit 120 receives an acquisition request of the moving image from the reproduction device 30. Furthermore, the communication unit 120 transmits the moving image, the depth map, and the control information to the reproduction device 30 under the control of the display control unit 108.

2-2-7. Storage Unit 122

The storage unit 122 may include, for example, a storage device 160 as described later. The storage unit 122 stores various types of data and various types of software. For example, as shown in FIG. 3, the storage unit 122 stores the moving image DB 124 and the user DB 126.

Note that the configuration of the server 10 according to the present embodiment is not limited to the example described above. For example, instead of being stored in the storage unit 122, one or more of the moving image DB 124 and the user DB 126 may be stored in another device (not shown) connected to the communication network 32.

2-3. PROCESS FLOW

The configuration of the present embodiment has been described above. Next, an example of a process flow according to the present embodiment will be described with reference to FIGS. 15 and 16. Note that an example of a flow of a process in a scene where a user using the reproduction device 30 desires to view a moving image registered in the server 10 will be described here.

Figure 15:
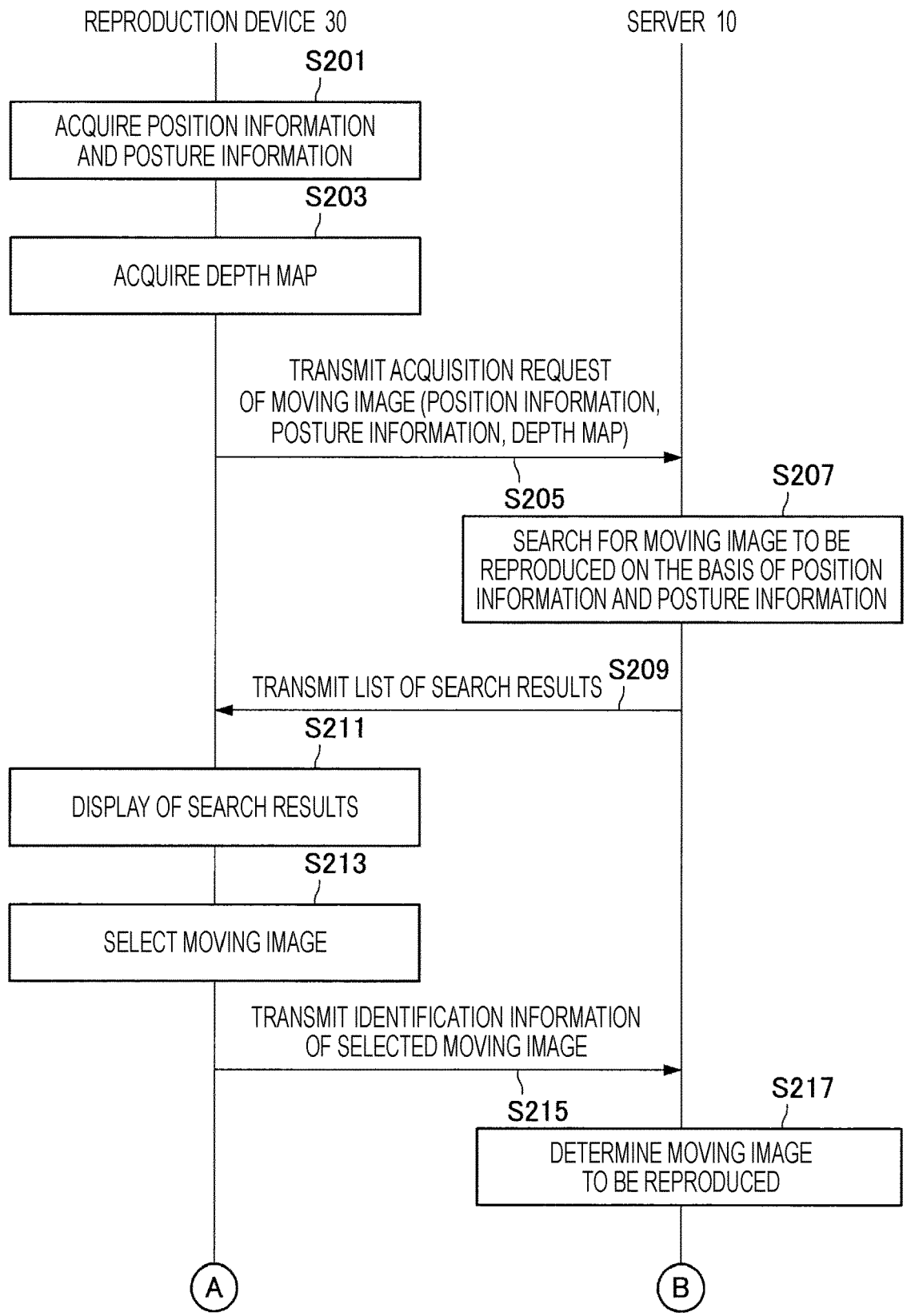
FIG. 15 is a sequence diagram showing a part of a flow of processing according to the same embodiment.

As shown in FIG. 15, first, the position information acquisition unit 302 of the reproduction device 30 acquires the current position information on the basis of the information received by the position information reception unit 322. Furthermore, the detection result acquisition unit 304 acquires the posture information of the reproduction device 30 on the basis of the sensing result by the sensor unit 324 (S201).

Subsequently, the detection result acquisition unit 304 acquires the depth map sensed by the sensor unit 324 (S203).

Thereafter, for example, when an instruction from the user is recognized, the moving image acquisition unit 308 generates an acquisition request of the moving image including the position information and the posture information acquired in S201 and the depth map acquired in S203. Then, under the control of the moving image acquisition unit 308, the communication unit 320 transmits the acquisition request to the server 10 (S205).

Thereafter, the selection unit 104 of the server 10 searches for a moving image to be reproduced from the moving image DB 124 on the basis of the position information and posture information included in the acquisition request received in S205 (S207). Then, the communication unit 120 transmits the list of search results to the reproduction device 30 under the control of the selection unit 104 (S209).

Thereafter, the display unit 326 of the reproduction device 30 displays a list of the received search results under the control of the display control unit 310. For example, for each moving image included in the list, the display unit 326 displays information such as a title and a thumbnail of the moving image in association with position information at the time of recording of the moving image (S211).

Then, when any of the moving images is selected by the viewer/listener from the list displayed in S211 (S213), the communication unit 320 transmits the identification information of the selected moving image to the server 10 under the control of the control unit 300 (S215).

Thereafter, the selection unit 104 of the server 10 determines the moving image corresponding to the received identification information as the moving image to be reproduced (S217).

Figure 16:
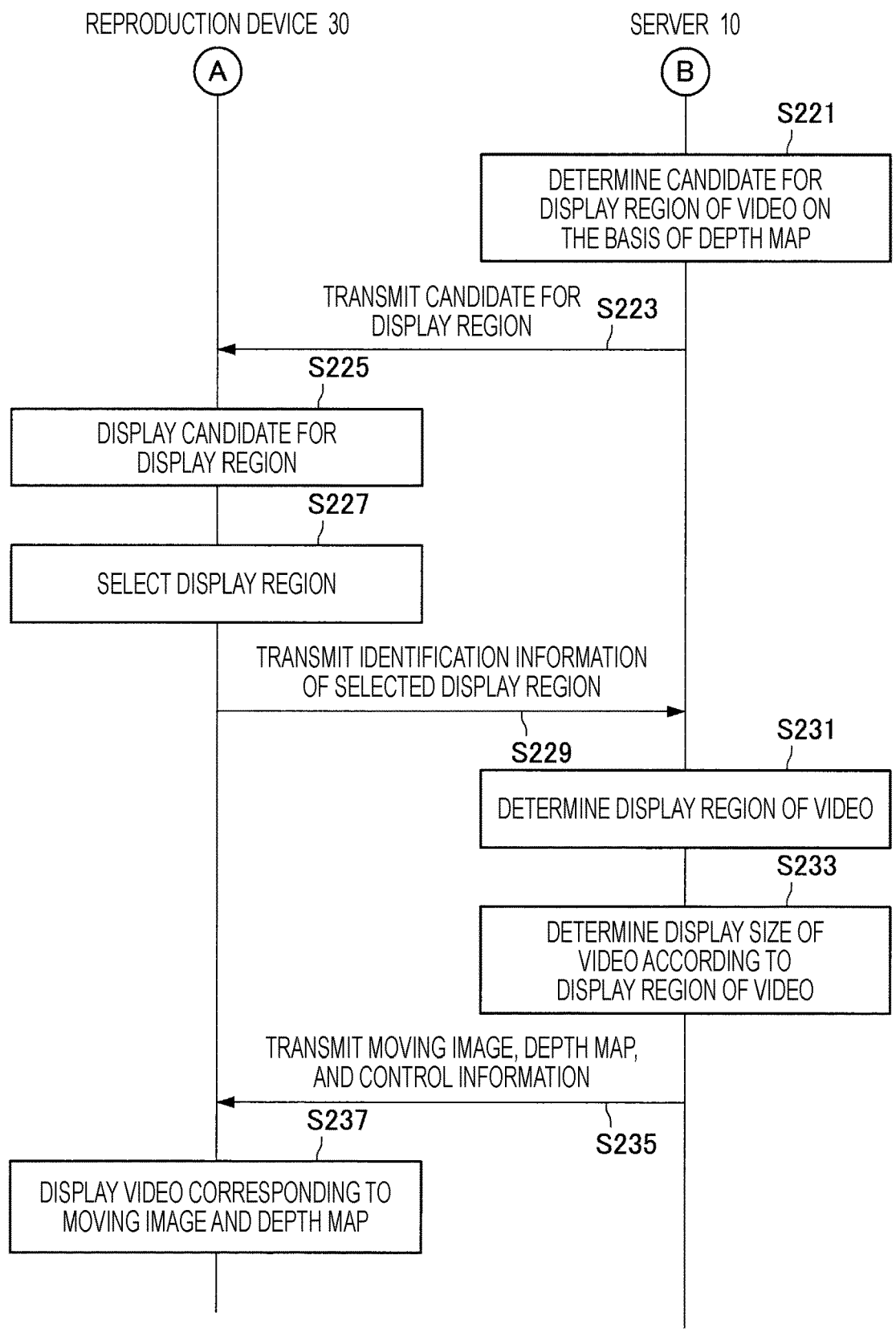
FIG. 16 is a sequence diagram showing a part of a flow of processing according to the same embodiment.

Here, referring to FIG. 16, a flow of processing after S217 will be described. As shown in FIG. 16, the determination unit 106 of the server 10 determines, a plurality of candidates for the display region of the moving image on the basis of the depth map included in the acquisition request received in S205 and the moving image to be reproduced determined in S217 (S221). Then, the communication unit 120 transmits all the determined candidates for the display region to the reproduction device 30 under the control of the determination unit 106 (S223).

Thereafter, the display unit 326 of the reproduction device 30 displays all the received candidates for the display region under the control of the display control unit 310 (S225).

Then, when it is recognized that any of all the displayed candidates has been selected by the viewer/listener (S227), the communication unit 320 transmits the identification information of the selected candidate to the server 10 under the control of the control unit 300 (S229).

Thereafter, the determination unit 106 of the server 10 determines the candidate corresponding to the received identification information as the display region of the corresponding video (S231). Subsequently, the determination unit 106 determines the display size of the corresponding video according to the determined display region (S233).

Subsequently, the display control unit 108 generates control information for displaying the corresponding video with the display size determined in S233 in the display region determined in S231. Then, the communication unit 120 transmits the moving image, the depth map associated with the moving image, and the generated control information to the reproduction device 30 (S235).

Thereafter, the display control unit 310 of the reproduction device 30 generates a video according to the received moving image and depth map on the basis of the received control information, and then, causes the display unit 326 to display the corresponding video (S237).

2-4. EFFECTS

2-4-1. Effect 1

As described above, according to the present embodiment, the server 10 determines the setting related to the display of the video when the video corresponding to the depth map sensed by the recording device 20 is displayed by the reproduction device 30, on the basis of the sensing result in the space where the reproduction device 30 is located. Therefore, for example, the server 10 can cause the reproduction device 30 to display the video optimized for the space where the reproduction device 30 is located.

2-4-2. Effect 2

Furthermore, according to the present embodiment, the viewer/listener can freely select whether to watch the moving image registered in the server 10 as a normal 2D moving image, experience the moving image as an AR, or experience the moving image as a VR.

2-4-3. Effect 3

Furthermore, according to the present embodiment, the viewer/listener can select whether to re-experience the situation at the time of photographing at the place where the moving image has been photographed or to view the moving image at a place different from the photographed place. Furthermore, in a case where the viewer/listener has selected to re-experience, the server 10 can change the reproduction speed and the scale of the corresponding video in real time according to the operation of the viewer/listener. Therefore, the viewer/listener can view, for example, the moving image included in the video more directly and in detail.

2-4-4. Effect 4

Furthermore, according to the present embodiment, it is possible to record and reproduce a three-dimensional video by the similar operation procedure as the conventional two-dimensional moving image photographing. Furthermore, for example, special environment such as registration of point cloud is unnecessary.

2-5. APPLICATION EXAMPLES

Next, application examples of the present embodiment will be described in "2-5-1. Application example 1" and "2-5-2. Application example 2".

2-5-1. Application Example 1

First, an application example 1 of the present embodiment will be described. This application example 1 as an application example of a scene where a viewer/listener (user A) views a moving image photographed in a state of skateboarding performed on the street at the same place.

First, it is assumed that the user A browses a moving image site managed by the server 10, for example, finds the moving image on the moving image site, and then, desires to view the moving image. Then, the user A desires to view the moving image higher realistic feeling, goes to the place where the moving image was photographed, and then, wears the reproduction device 30 (which is a transmissive wearable device), and gives an instruction to reproduce the moving image.

In this case, the position information acquisition unit 302 of the reproduction device 30 acquires the current position information. Then, the communication unit 320 transmits the acquisition request of the moving image including the position information to the server 10 under the control of the display control unit 310.

Thereafter, the selection unit 104 of the server 10 selects the moving image corresponding to the received acquisition request as the moving image to be reproduced. Subsequently, the display control unit 108 performs matching between the feature point specified from the image photographed by the camera of the reproduction device 30 and the feature point specified from the moving image to be reproduced, and then, specifies a recommended reproduction point at which the corresponding moving image is appropriately reproduced. Then, the display control unit 108 causes the display unit 326 of the reproduction device 30 to display a mark indicating the position of the specified recommended reproduction point. Note that, in this example, it is assumed that there are one or more other moving images photographed simultaneously with the corresponding moving image.

Here, the recommended reproduction point may be a space in which the evaluation value indicating to what extent the corresponding moving image is displayed appropriately (in the space where the reproduction device 30 is located) is equal to or larger than a certain value. Note that the calculation method of the evaluation value may be similar to the calculation method at the time of switching decision of stream by the selection unit 104 (described in Section 2-2).

Thereafter, the user A desired to view the moving image at the recommended reproduction point where the stairs can be overlooked, and then, moved to the recommended reproduction point. In this case, the display control unit 108 of the server 10 causes the display unit 326 of the reproduction device 30 to display a guide display indicating the orientation of the reproduction device 30 recommended when the moving image is reproduced. Then, when the user A changes the posture according to the guide display, the display control unit 108 performs calibration of the moving image on the basis of the received detection result of the change in the posture of the reproduction device 30, and thereafter, causes the reproduction device 30 to display the video corresponding to the moving image and the depth map associated with the moving image.

Thereafter, the user A felt difficult to watch when the video of the background portion is displayed, since the video of the background portion overlaps with the real landscape, and the user A designated the background portion to be not displayed by a sound command, for example. In this case, the display control unit 108 of the server 10 causes the reproduction device 30 to display the video of only the region of the foreground portion (that is, the player of the skateboard) on the reproduction device 30 on the basis of the result of the object recognition based on the image photographed by the camera of the reproduction device 30 and the depth map sensed by the reproduction device 30.

Then, when the user A moves during reproduction of the video, the selection unit 104 of the server 10 selects another more suitable moving image on the basis of the position information of the reproduction device 30 after the movement, and then, switches the moving image being reproduced to the another moving image. Furthermore, as the user A moves while performing operations such as pause and step reproduction, the user A can check the form or the like of the player of the skateboard in detail.

Note that, in the above description, the example in which the user A views the moving image with only one person is described. However, the present invention is not limited to this example. For example, it is also possible that two or more users simultaneously view the moving image together at the same place, for example.

2-5-2. Application Example 2

Next, an application example 2 of the present embodiment will be described. This application example 2 is an application example of scenes where a user (user A) photographs a moving image of his/her dance and then, uploads the moving image to the server 10.

First, the user A fixes the camera of the smartphone (recording device 20*a*) in the predetermined room facing the direction of the user A. Then, the recording device 20*a* photographs the video of the user A. Furthermore, another user (user B) located in the room photographed the user A by the carrying recording device 20*b* closer to the user A than the recording device 20*a*. Note that it is assumed that the recording device 20*b* is set to photograph a video in synchronization with the recording device 20*a*. Furthermore, the user A sets the viewing of the moving image photographed by the recording device 20*a* to be free, and the viewing of the moving image photographed by the recording device 20*b* to be charged.

Furthermore, with regard to the moving images photographed by the recording device 20*a* and the recording device 20*b*, the user A sets only 1 m×2 m on the floor on which the user A dances as the foreground space, and sets the video of other than the space of the foreground to be not distributed.

Thereafter, another user C found a moving image photographed by the recording device 20*a* on the moving image site managed by the server 10, desires to view the moving image for free, and then, designates, on the desk of own room, as the display region of the moving image. In this case, the determination unit 106 of the server 10 determines, on the desk in the room of the user C as the display region of the moving image on the basis of the designation of the user C, and then, determines the display size of the moving image as "reduced size". Subsequently, the display control unit 108 causes the reproduction device 30*a* worn by the user C to display the video of only the foreground portion generated from the moving image and the depth map associated with the moving image in the display region and with the determined display size.

Furthermore, the display control unit 108 causes the reproduction device 30*a* to further display avatars of other viewer/listeners viewing the corresponding video at the same time. As a result, the realistic feeling can be improved. Furthermore, the display control unit 108 may cause (the display unit 326 of) the reproduction device 30*a* to further display the posted information each time information such as sound, comment, or the like, for example, is posted from the other viewer/listener.

Furthermore, another user D found the video photographed by the recording device 20*a* in the moving image site, desires to view the moving image, and then, designates the floor of his/her own room (that has a larger area than 1 m×2 m) as the display region. Furthermore, the user D desires to reproduce the moving image at full scale and paid a predetermined amount.

In this case, the determination unit 106 of the server 10 determines a plurality of candidates for the display region in which the moving image can be displayed at full scale, on the basis of the depth map sensed in the room of the user D, and then, causes (the display unit 326) the reproduction device 30*b* worn in the head of the user D to display the plurality of candidates for the display region. Thereafter, when it is detected that the user D has moved to any position of the plurality of candidates for the display region, the determination unit 106 of the server 10 determines the candidate corresponding to the corresponding position as the display region of the corresponding moving image. Then, the display control unit 108 causes the (display unit 326 of) the reproduction device 30*b* to display the video corresponding to the corresponding moving image and the depth map associated with the moving image in the determined display region and at full scale. As a result, the user D can view the video with higher realistic feeling.

3. HARDWARE CONFIGURATION

Figure 17:
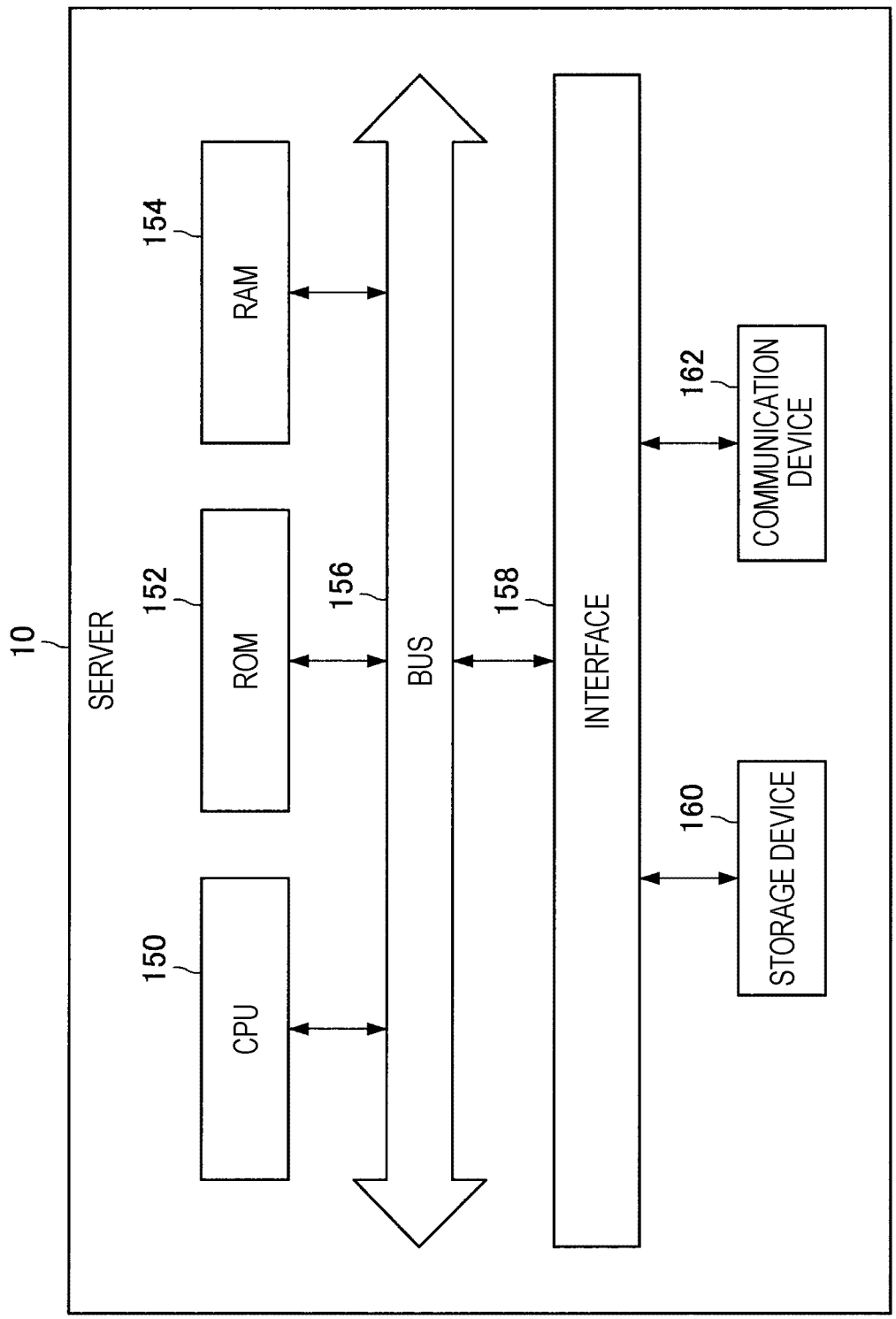
FIG. 17 is an explanatory diagram showing an example of a hardware configuration of the server 10 according to the same embodiment.

The application examples of this embodiment have been described above. Next, the hardware configuration of the server 10 according to the present embodiment will be described with reference to FIG. 17. As shown in FIG. 17, the server 10 includes a CPU 150, a read only memory (ROM) 152, a RAM 154, a bus 156, an interface 158, a storage device 160, and a communication device 162.

The CPU 150 functions as an operation processing device and a control device, and controls the overall operation in the server 10 according to various programs. Furthermore, the CPU 150 realizes the function of the control unit 100 in the server 10. Note that the CPU 150 includes a processor such as a microprocessor.

The ROM 152 stores control data such as program or operation parameters used by the CPU 150, or the like.

The RAM 154 temporarily stores, for example, a program executed by the CPU 150, data being used, or the like.

The bus 156 includes a CPU bus or the like. The bus 156 mutually connects the CPU 150, the ROM 152, and the RAM 154.

The interface 158 connects the storage device 160 and the communication device 162 to the bus 156.

The storage device 160 is a device for storing data, that functions as the storage unit 122. The storage device 160 includes, for example, a storage medium, a recording device that records data in the storage medium, a reading device that reads data from the storage medium, a deletion device that deletes data recorded in the storage medium, or the like.

The communication device 162 is a communication interface including a communication device (for example, a network card, or the like), or the like for connecting to the communication network 32 or the like, for example. Furthermore, the communication device 162 may be a wireless LAN compatible communication device, a long term evolution (LTE) compatible communication device, or a wire communication device that performs wired communication. The communication device 162 functions as the communication unit 120.

4. MODIFICATION

While preferred embodiment of the present disclosure has been described in detail with reference to the accompanying drawings, the disclosure is not limited to such examples. It is obvious that various variations and modifications can be conceived within the scope of the technical idea described in the claims by a person having ordinary knowledge in the field of technology to which the present disclosure belongs, and, of course, it is understood that these variations and modifications belong to the technical scope of present disclosure.

4-1. MODIFICATION 1

For example, in a case where a plurality of moving images synchronously photographed are registered in the moving image DB 124, (the selection unit 104 of) the server 10 may collectively select the plurality of moving images as moving images to be reproduced, and the display control unit 108 may cause (the display unit 326 of)the reproduction device 30 to simultaneously display the plurality of moving images. Alternatively, the display control unit 108 may cause the reproduction device 30 to display three-dimensional information (for example, depth data, point cloud, mesh, or the like) generated on the basis of the corresponding plurality of moving images (instead of the plurality of moving images). According to this modification, for example, even if the position and posture of the reproduction device 30 deviate greatly from the position and posture of the recording device 20 at the time of photographing the moving image, the breakage of drawing can be alleviated.

4-2. MODIFICATION 2

Furthermore, (the display control unit 108 of) the server 10 may set a plurality of reproduction start times for the (single) moving image selected as the moving image to be reproduced on the basis of, for example, a user instruction. Then, the display control unit 108 may cause the display unit 326 of the reproduction device 30 to simultaneously display the moving image in different display region with respect to each of the plurality of reproduction start times, at the reproduction start times. That is, a single moving image can be reproduced for the number of the plurality of reproduction start times, at the same time. As a result, the viewer/listener can check in detail the changes, or the like in the motion in the moving image, particularly in the scene where the form of the athlete is checked, the scene where the moving image photographed by the surveillance camera is checked, or the like.

4-3. MODIFICATION 3

Furthermore, in the embodiment described above, the example in which the server 10 selects the moving image to be reproduced or determines the display region of the moving image has been described, but the present invention is not limited to such an example. For example, the reproduction device 30 may select the moving image to be reproduced, or may determine the display region of the moving image. That is, all or a part of the functions of the selection unit 104, the determination unit 106, and the display control unit 108 described above may be included in the reproduction device 30 instead of the server 10. Furthermore, in this case, the information processing device according to the present disclosure may be the reproduction device 30.

As an example, the reproduction device 30 first receives from the server 10 a list of moving images photographed within a predetermined range from the position information, acquired by the position information acquisition unit 302. Then, for example, in a case where it is detected that the reproduction device 30 approaches to any position of the position information associated with each moving image included in the list of moving images, the reproduction device 30 may determine the moving image associated with the position information as the moving image to be reproduced. Furthermore, the reproduction device 30 may identify, for example, a plane, a feature point, or the like in the real space in which the reproduction device 30 is located, on the basis of the depth map sensed by the sensor unit 324, to determine the display region of the moving image to be reproduced, and the display size of the moving image. Then, the reproduction device 30 may cause the display unit 326 to display the video corresponding to the moving image and the depth map associated with the moving image in the determined display region and with the determined display size.

4-4. MODIFICATION 4

Furthermore, the configuration of the information processing system according to the embodiment described above is not limited to the example shown in FIG. 1. For example, although only one server 10 is shown in FIG. 1, it is not limited to this example, and a plurality of computers may cooperatively operate to realize the functions of the server 10 according to the present embodiment.

Furthermore, in the embodiment described above, an example in which the information processing apparatus according to the present disclosure is the server 10 has been described, but the present invention is not limited to such an example. For example, the information processing apparatus may be a general-purpose personal computer (PC), a tablet terminal, a game machine, a mobile phone such as a smartphone, a portable music player, a robot, or the like.

4-5. MODIFICATION 5

Furthermore, each step in the flow of processing of the embodiment described above may not necessarily be processed in the described order. For example, each step may be processed in an appropriately changed order. Furthermore, instead of being processed in chronological order, each step may be processed partly in parallel or separately. Furthermore, some of the steps described may be omitted, or additional steps may be added.

Furthermore, according to the embodiment described above, it is also possible to provide a computer program for causing hardware such as the CPU 150, the ROM 152, the RAM 154, and the like to exhibit the same functions as those of each configuration of the server 10 according to the embodiment described above. Furthermore, a recording medium on which the computer program is recorded is also provided.

Furthermore, the effects described in this specification are merely illustrative or exemplary, and are not limitative. That is, the technology according to the present disclosure can exhibit other effects obvious to those skilled in the art from the description of the present specification together with the effects described above or instead of the effects described above.

Note that the following configuration is also within the technical scope of the present disclosure.

(1)

An information processing apparatus including a determination unit that determines a setting related to display of a video when the video corresponding to first three-dimensional information sensed in a first real space is displayed in a second real space, on the basis of a sensing result in the second real space.

(2)

The information processing apparatus according to (1) described above, in which the video is generated according to a moving image photographed in the first real space in association with sensing of the first three-dimensional information and the first three-dimensional information.

(3)

The information processing apparatus according to (2) described above, in which the setting related to display of the video includes a setting related to a display region in which the video is displayed in the second real space, the determination unit determines the display region of the video on the basis of the sensing result in the second real space, and a display unit in the second real space displays the video in association with the display region of the video.

(4)

The information processing apparatus according to (3) described above, in which the sensing result in the second real space includes second three-dimensional information sensed in the second real space.

(5)

The information processing apparatus according to (4) described above, in which the determination unit determines the display region of the video on the basis of a sensing result of a plane in the second real space and a sensing result in a vertical direction in the second real space.

(6)

The information processing apparatus described in any one of (3) to (5) described above, in which the determination unit determines a plurality of candidates for the display region of the video in the second real space on the basis of the sensing result in the second real space, the information processing apparatus further includes a display control unit that causes the display unit to display the plurality of candidates for the display region of the video, and the determination unit determines a candidate that is determined to be selected by a user in the second real space among the plurality of candidates for the display region of the video, as the display region of the video.

(7)

The information processing apparatus according to any one of (3) to (6) described above, in which when a plurality of videos corresponding to plurality of pieces of three-dimensional information sensed in the first real space are displayed in the second real space, the determination unit further determines the display region of each of the plurality of videos such that each of the plurality of videos are displayed in a predetermined positional relationship.

(8)

The information processing apparatus according to any one of (3) to (7) described above, in which the setting related to the display of the video further includes a setting related to a display size of the video.

(9)

The information processing apparatus according to (8) described above, in which the determination unit determines the display size of the video according to a size of the display region of the video.

(10)

The information processing apparatus according to (9) described above, in which the setting related to the display of the video further includes a setting related to a reproduction speed or a reproduction start timing of the video.

(11)

The information processing apparatus according to (9) or (10) described above, in which the setting related to the display of the video further includes a setting related to a display mode of the video, and the determination unit determines any of a first display mode in which a video with a predetermined space in the first real space as a basis is continuously displayed, and a second display mode in which a video with a predetermined moving body in the first real space as a basis is continuously displayed, as a display mode of the video on the basis of the sensing result in the second real space.

(12)

The information processing apparatus according to any one of (9) to (11) described above, further including a display control unit that causes the display unit to display the video in association with the display region of the video.

(13)

The information processing apparatus according to (12) described above, in which the display control unit causes the display unit to display the video with the display size determined by the determination unit in the display region of the video determined by the determination unit.

(14)

The information processing apparatus according to (13) described above, in which the video is a video corresponding to a predetermined space in the first real space including a predetermined object recognized on the basis of the first three-dimensional information or the moving image.

(15)

The information processing apparatus according to (13) described above, in which the video is a video corresponding to a predetermined space specified by a user, in the first real space.

(16)

The information processing apparatus according to any one of (13) to (15) described above, in which the sensing result in the second real space includes an image photographed in the second real space, and color information of the moving image is corrected on the basis of a comparison between a color temperature specified from the moving image and a color temperature specified from the captured image, and the video is generated according to the corrected moving image.

(17)

The information processing apparatus according to any one of (2) to (16) described above, in which the sensing result in the second real space includes a sensing result of position information of the second real space, and the video is further generated according to a positional relationship between the first real space and the second real space.

(18)

The information processing apparatus according to (17) described above, in which the first real space is a space located within a predetermined threshold from the second real space.

(19)

An information processing method including determining, by a processor, a setting related to display of a video when the video corresponding to first three-dimensional information sensed in a first real space is displayed in a second real space, on the basis of a sensing result in the second real space.

(20)

A program for causing a computer to function as a determination unit that determines a setting related to display of a video when the video corresponding to first three-dimensional information sensed in a first real space is displayed in a second real space, on the basis of a sensing result in the second real space.

REFERENCE SIGNS LIST

10 Server
20 Recording device
30 Reproduction device
32 Communication network
100, 300 Control unit
102 Registration unit
104 Selection unit
106 Determination part
108, 310 Display control unit
120, 320 Communication unit
122, 328 Storage unit
124 Moving image DB
126 User DB
302 Position information acquisition unit
304 Detection result acquisition unit
306 Recognition unit
308 Moving image acquisition unit
322 Position information reception unit
324 Sensor unit
326 Display unit

The invention claimed is:

1. An information processing apparatus comprising
a determination unit that determines a setting related to display of a video when the video corresponding to first three-dimensional information sensed in a first real space is displayed in a second real space, on a basis of a sensing result in the second real space,
wherein the setting related to display of the video comprises a setting related to a size of a display region of the video in the second real space,
wherein the setting related to the display of the video further includes a setting related to a display mode of the video,
wherein the determination unit determines any of a first display mode in which a video with a predetermined space in the first real space as a basis is continuously displayed, and a second display mode in which a video with a predetermined moving body in the first real space as a basis is continuously displayed, as a display mode of the video on the basis of the sensing result in the second real space, and
wherein the determination unit is implemented via at least one processor.

2. The information processing apparatus according to claim 1, wherein the video is generated according to a moving image photographed in the first real space in association with sensing of the first three-dimensional information.

3. The information processing apparatus according to claim 2,
wherein the setting related to display of the video includes a setting related to the display region in which the video is displayed in the second real space,
wherein the determination unit determines the display region of the video on the basis of the sensing result in the second real space, and
wherein a display in the second real space displays the video in association with the display region of the video.

4. The information processing apparatus according to claim 3, wherein the sensing result in the second real space includes second three-dimensional information sensed in the second real space.

5. The information processing apparatus according to claim 4, wherein the determination unit determines the display region of the video on a basis of a sensing result of a plane in the second real space and a sensing result in a vertical direction in the second real space.

6. The information processing apparatus according to claim 3,
wherein the determination unit determines a plurality of candidates for the display region of the video in the second real space on the basis of the sensing result in the second real space,
wherein the information processing apparatus further includes a display control unit that causes the display to display the plurality of candidates for the display region of the video,
wherein the determination unit determines a candidate that is determined to be selected by a user in the second real space among the plurality of candidates for the display region of the video, as the display region of the video, and
wherein the display control unit is implemented via at least one processor.

7. The information processing apparatus according to claim 3, wherein, when a plurality of videos corresponding to plurality of pieces of three-dimensional information sensed in the first real space are displayed in the second real space, the determination unit further determines the display region of each of the plurality of videos such that each of the plurality of videos are displayed in a predetermined positional relationship.

8. The information processing apparatus according to claim 3, wherein the setting related to the display of the video further includes a setting related to a display size of the video.

9. The information processing apparatus according to claim 8, wherein the determination unit determines the display size of the video according to the size of the display region of the video.

10. The information processing apparatus according to claim 9, wherein the setting related to the display of the video further includes a setting related to a reproduction speed or a reproduction start timing of the video.

11. The information processing apparatus according to claim 9, further comprising a display control unit that causes the display unit to display the video in association with the display region of the video,
wherein the display control unit is implemented via at least one processor.

12. The information processing apparatus according to claim 11, wherein the display control unit causes the display unit to display the video with the display size determined by the determination unit in the display region of the video determined by the determination unit.

13. The information processing apparatus according to claim 12, wherein the video is a video corresponding to a predetermined space in the first real space including a predetermined object recognized on a basis of the first three-dimensional information or the moving image.

14. The information processing apparatus according to claim 12, wherein the video is a video corresponding to a predetermined space designated by a user, in the first real space.

15. The information processing apparatus according to claim 12,
wherein the sensing result in the second real space includes an image photographed in the second real space, and
wherein color information of the moving image is corrected on a basis of a comparison between a color temperature specified from the moving image and a color temperature specified from the photographed image, and the video is generated according to the corrected moving image.

16. The information processing apparatus according to claim 2,
wherein the sensing result in the second real space includes a sensing result of position information of the second real space, and
wherein the video is further generated according to a positional relationship between the first real space and the second real space.

17. The information processing apparatus according to claim 16, wherein the first real space is a space located within a predetermined threshold from the second real space.

18. An information processing method comprising:
determining, by a processor, a setting related to display of a video when the video corresponding to first three-dimensional information sensed in a first real space is displayed in a second real space, on a basis of a sensing result in the second real space,
wherein the setting related to display of the video comprises a setting related to a size of a display region of the video in the second real space,
wherein the setting related to the display of the video further includes a setting related to a display mode of the video, and
wherein any of a first display mode in which a video with a predetermined space in the first real space as a basis is continuously displayed, and a second display mode in which a video with a predetermined moving body in the first real space as a basis is continuously displayed, is determined as a display mode of the video on the basis of the sensing result in the second real space.

19. A non-transitory computer-readable storage medium having embodied thereon a program, which when executed by a computer causes the computer to execute a method, the method comprising:
determining a setting related to display of a video when the video corresponding to first three-dimensional information sensed in a first real space is displayed in a second real space, on a basis of a sensing result in the second real space,
wherein the setting related to display of the video comprises a setting related to a size of a display region of the video in the second real space,
wherein the setting related to the display of the video further includes a setting related to a display mode of the video, and
wherein any of a first display mode in which a video with a predetermined space in the first real space as a basis is continuously displayed, and a second display mode in which a video with a predetermined moving body in the first real space as a basis is continuously displayed, is determined as a display mode of the video on the basis of the sensing result in the second real space.

* * * * *